(12) United States Patent
Park

(10) Patent No.: US 12,158,631 B2
(45) Date of Patent: Dec. 3, 2024

(54) CAMERA MODULE

(71) Applicants: LG INNOTEK CO., LTD., Seoul (KR); CORNING INCORPORATED, Corning, NY (US)

(72) Inventor: Seung Ryong Park, Seoul (KR)

(73) Assignees: LG INNOTEK CO., LTD., Seoul (KR); CORNING INCORPORATED, Corning, NY (US)

( * ) Notice: Subject to any disclaimer, the term of this patent is extended or adjusted under 35 U.S.C. 154(b) by 721 days.

(21) Appl. No.: 17/052,886

(22) PCT Filed: May 2, 2019

(86) PCT No.: PCT/KR2019/005270
§ 371 (c)(1),
(2) Date: Nov. 4, 2020

(87) PCT Pub. No.: WO2019/212260
PCT Pub. Date: Nov. 7, 2019

(65) Prior Publication Data
US 2021/0231907 A1 Jul. 29, 2021

(30) Foreign Application Priority Data
May 4, 2018 (KR) .......................... 10-2018-0052032

(51) Int. Cl.
*G02B 7/09* (2021.01)
*G02B 3/14* (2006.01)
(Continued)

(52) U.S. Cl.
CPC ................. *G02B 7/09* (2013.01); *G02B 3/14* (2013.01); *G02B 7/021* (2013.01); *G03B 13/36* (2013.01)

(58) Field of Classification Search
CPC ........ G02B 3/14; G02B 26/005; G02B 7/028; G02B 26/004; G02B 3/12
See application file for complete search history.

(56) References Cited

U.S. PATENT DOCUMENTS 6,885,819 B2 * 4/2005 Shinohara .............. H04N 23/67
250/201.2
2005/0041301 A1 2/2005 Kibayashi
(Continued)

FOREIGN PATENT DOCUMENTS

CN 1947036 A 4/2007
CN 102150063 A 8/2011
(Continued)

OTHER PUBLICATIONS

Hongxia et al., "Temperature effects on dielectric liquid lenses", Optics Express, vol. 22, No. 2, Jan. 22, 2014, pp. 1930-1939.

*Primary Examiner* — Christopher Stanford
(74) *Attorney, Agent, or Firm* — Birch, Stewart, Kolasch & Birch, LLP

(57) ABSTRACT

The present invention provides a camera module includes a lens assembly comprising a liquid lens and at least one solid lens disposed above or below the liquid lens, the liquid lens comprising a plurality of individual electrodes and a common electrode; a driving driver configured to supply a voltage through the common electrode and at least one of the plurality of individual electrodes in the liquid lens in order to control an interface of the liquid lens; a capacitance measurement circuit configured to measure capacitance between the common electrode and at least one of the plurality of individual electrodes in the liquid lens; an operation state storage unit configured to store information on capacitance that varies depending on variation in temperature in the liquid lens; and a control unit to determine a
(Continued)

temperature in the liquid lens based on the capacitance measured by the capacitance measurement circuit and the information.

16 Claims, 21 Drawing Sheets

(51) Int. Cl.
*G02B 7/02* (2021.01)
*G03B 13/36* (2021.01)

(56) References Cited

U.S. PATENT DOCUMENTS

| | | |
|---|---|---|
| 2005/0238081 A1 | 10/2005 | Takashima et al. |
| 2006/0152617 A1 | 7/2006 | Konishi |
| 2007/0125178 A1 | 6/2007 | Rosenau et al. |
| 2007/0127120 A1 | 6/2007 | Onuki et al. |
| 2007/0236802 A1 | 10/2007 | Kohno |
| 2007/0279757 A1* | 12/2007 | Renders ............... G02B 3/14 359/665 |
| 2008/0062529 A1 | 3/2008 | Helwegen et al. |
| 2008/0239450 A1* | 10/2008 | Immink ............... G02B 26/005 359/254 |
| 2008/0316610 A1* | 12/2008 | Dobrusskin ......... G02B 26/005 359/666 |
| 2009/0072037 A1 | 3/2009 | Good et al. |
| 2012/0105707 A1 | 5/2012 | Futami et al. |
| 2018/0292725 A1 | 10/2018 | Moon et al. |

FOREIGN PATENT DOCUMENTS

| | | |
|---|---|---|
| CN | 103163674 A | 6/2013 |
| JP | 2000-81503 A | 3/2000 |
| JP | 2005-62632 A | 3/2005 |
| JP | 2007-534985 A | 11/2007 |
| JP | 2008172682 A * | 7/2008 |
| JP | 2013-101227 A | 5/2013 |
| JP | 2014-513319 A | 5/2014 |
| JP | 2017-68195 A | 4/2017 |
| JP | 2017-85321 A | 5/2017 |
| KR | 10-2006-0081364 A | 7/2006 |
| KR | 10-2017-0055142 A | 5/2017 |
| KR | 10-1821189 B1 | 1/2018 |

* cited by examiner

[FIG. 1]
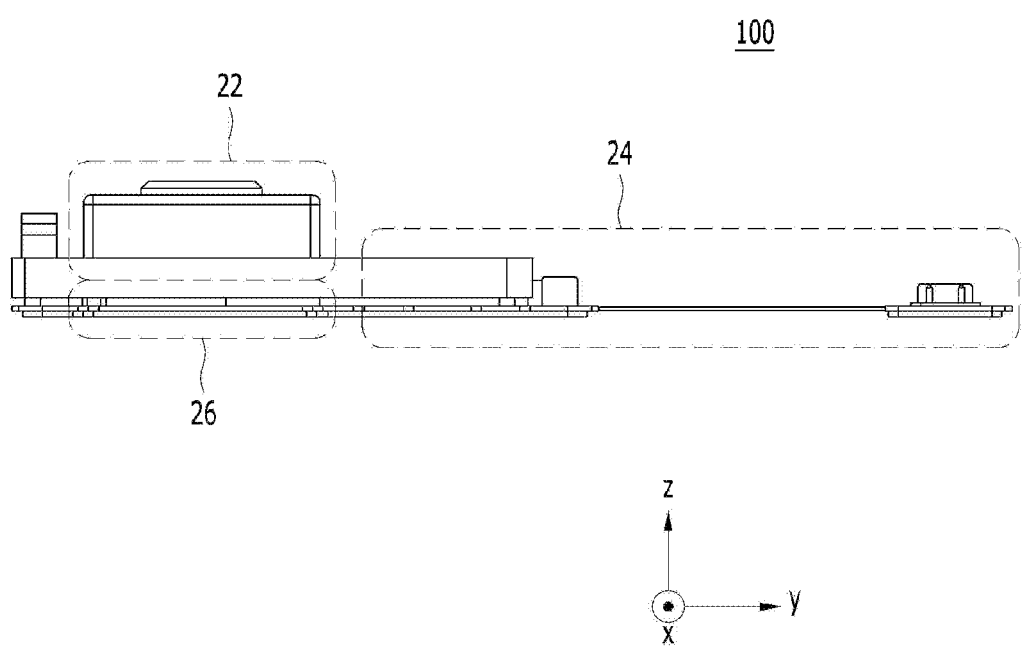

[FIG. 2]
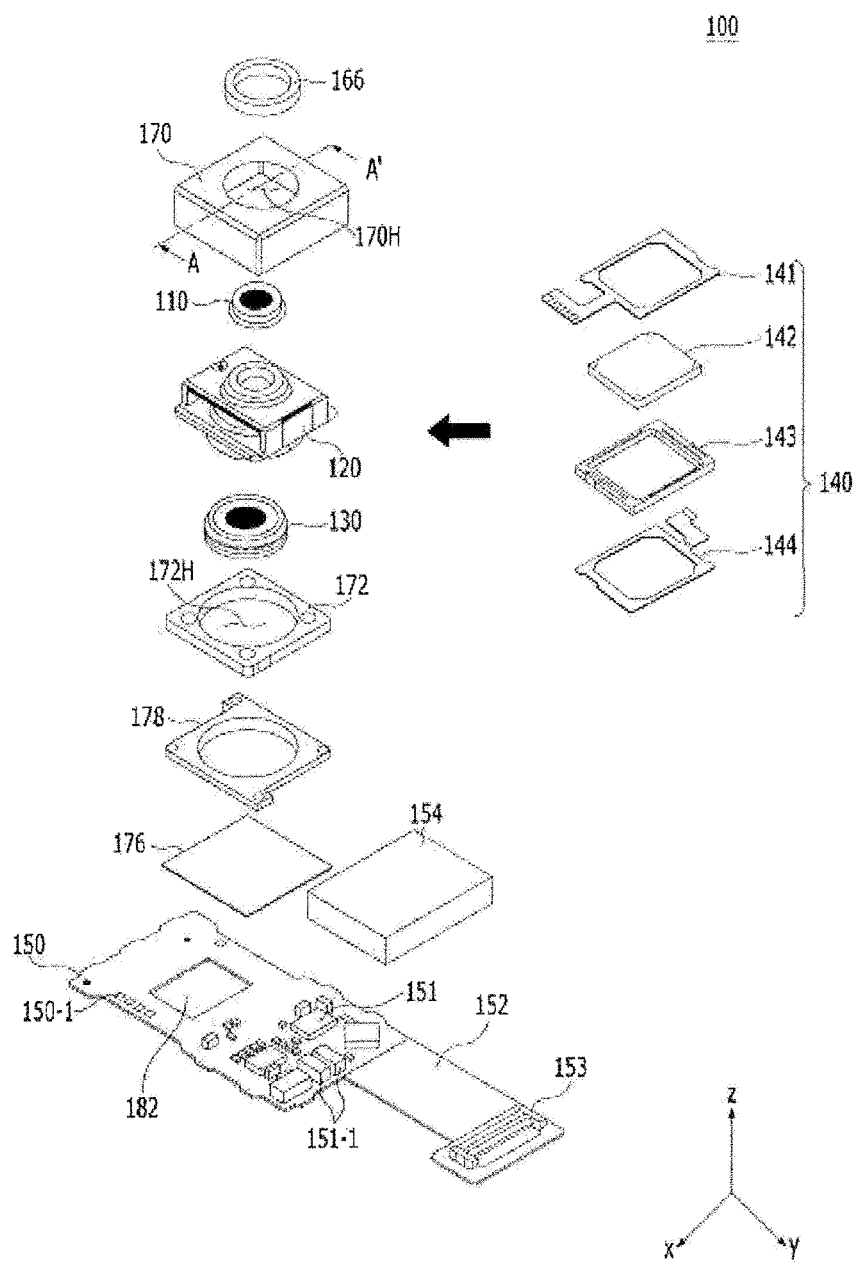

[FIG. 3]
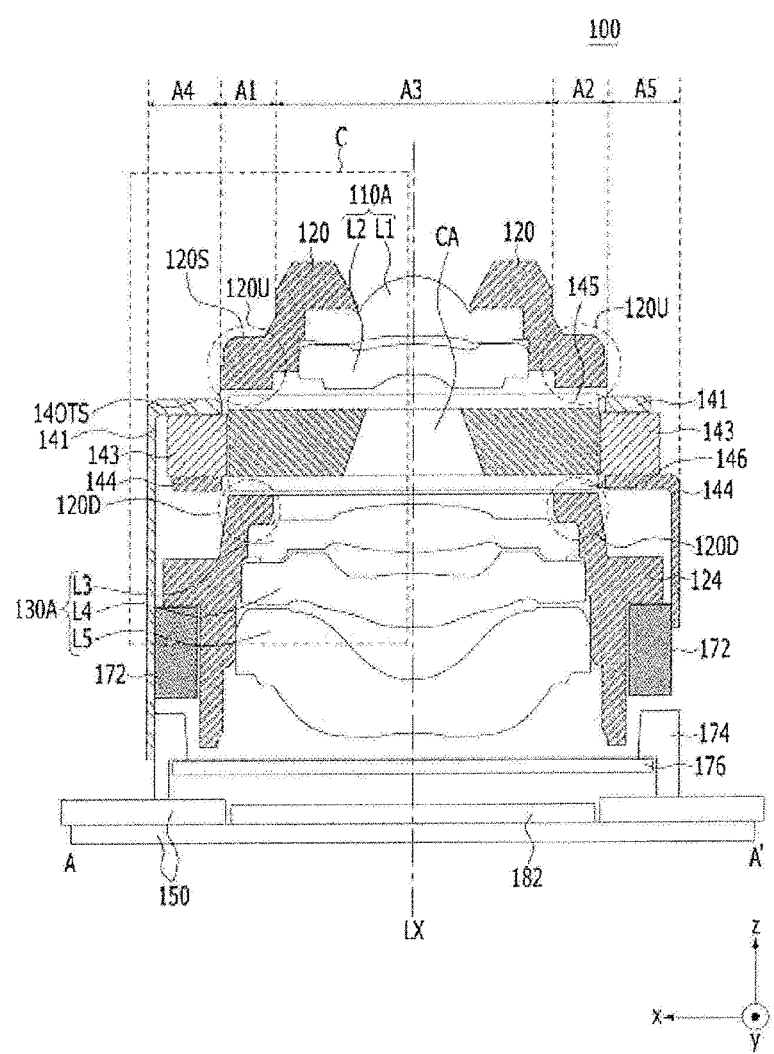

[FIG. 4]
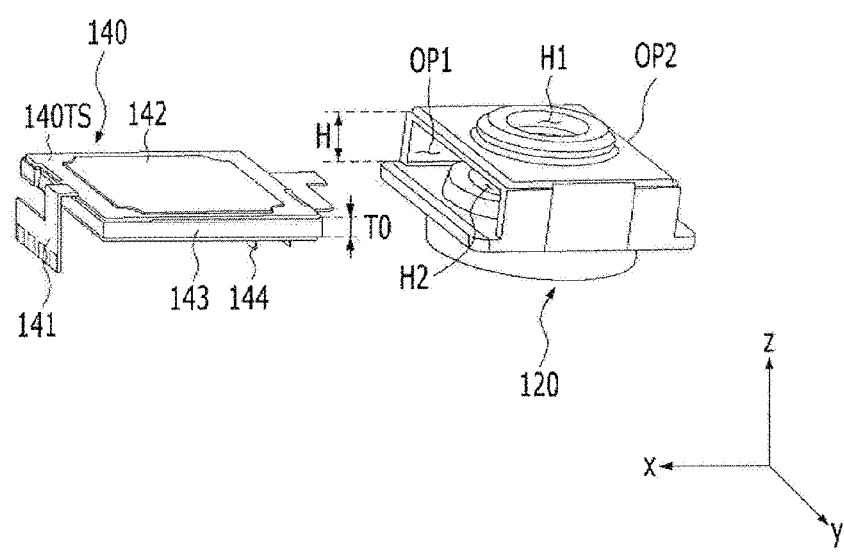

[FIG. 5]
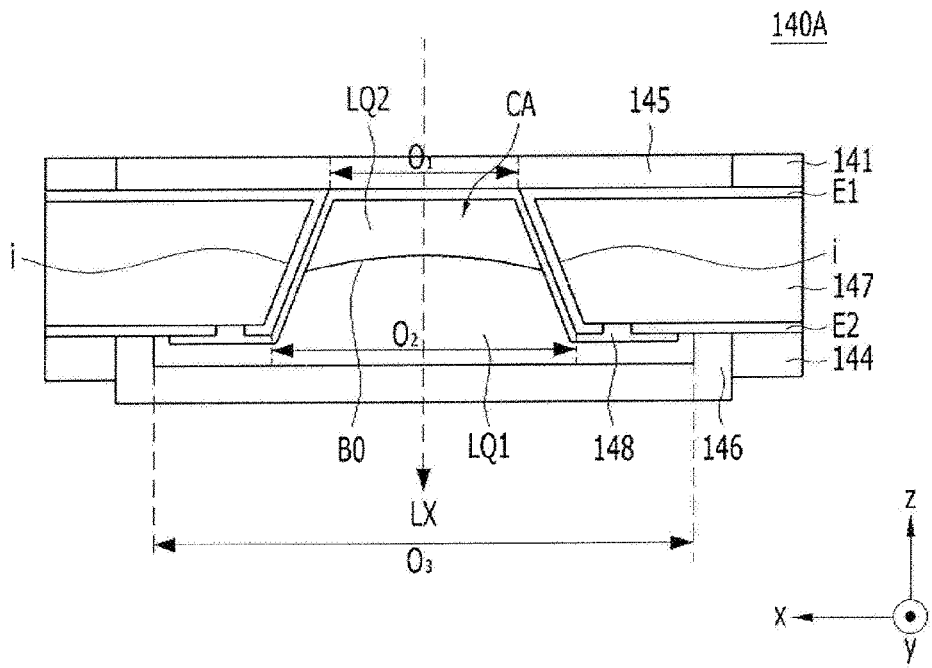
[FIG. 6]
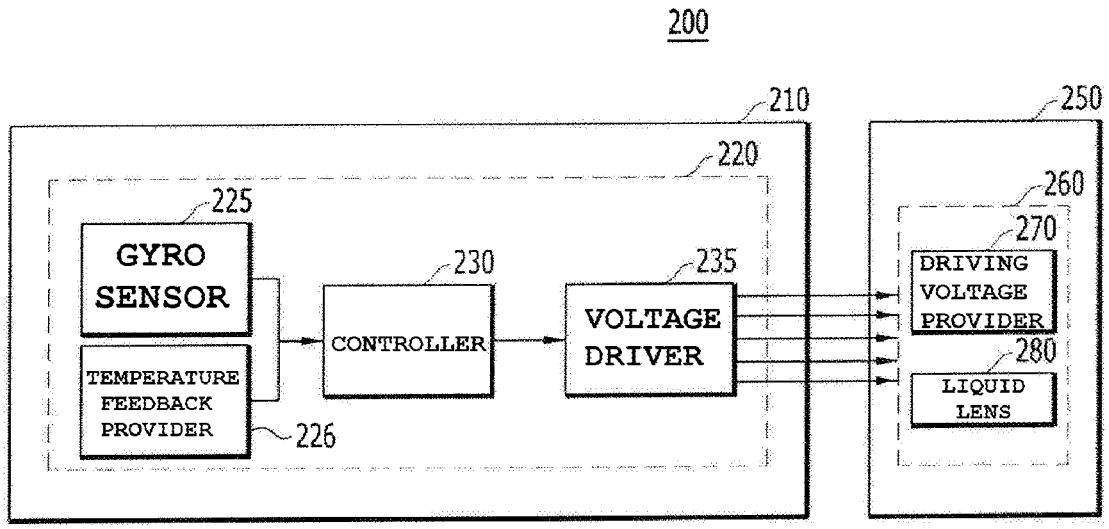

[FIG. 7]
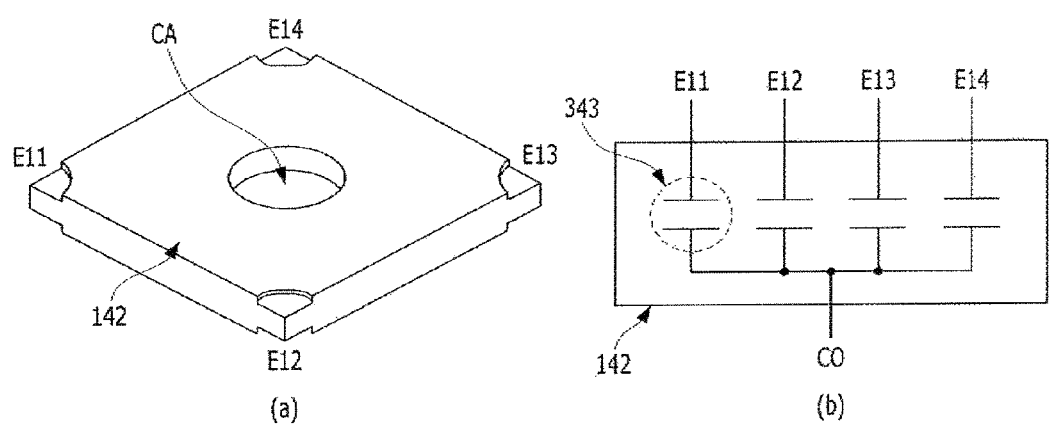
[FIG. 8]
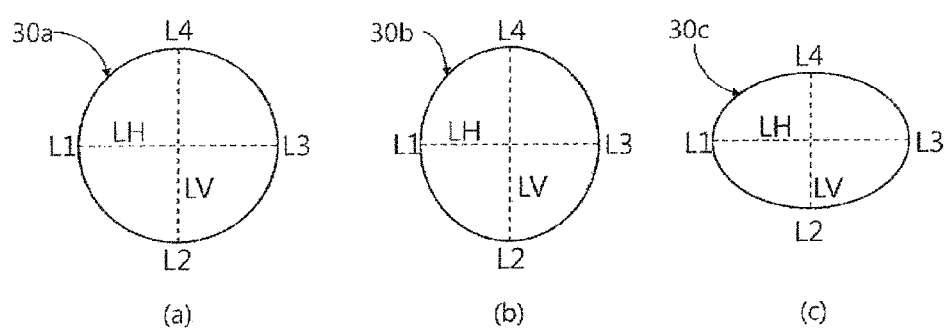

[FIG. 9]
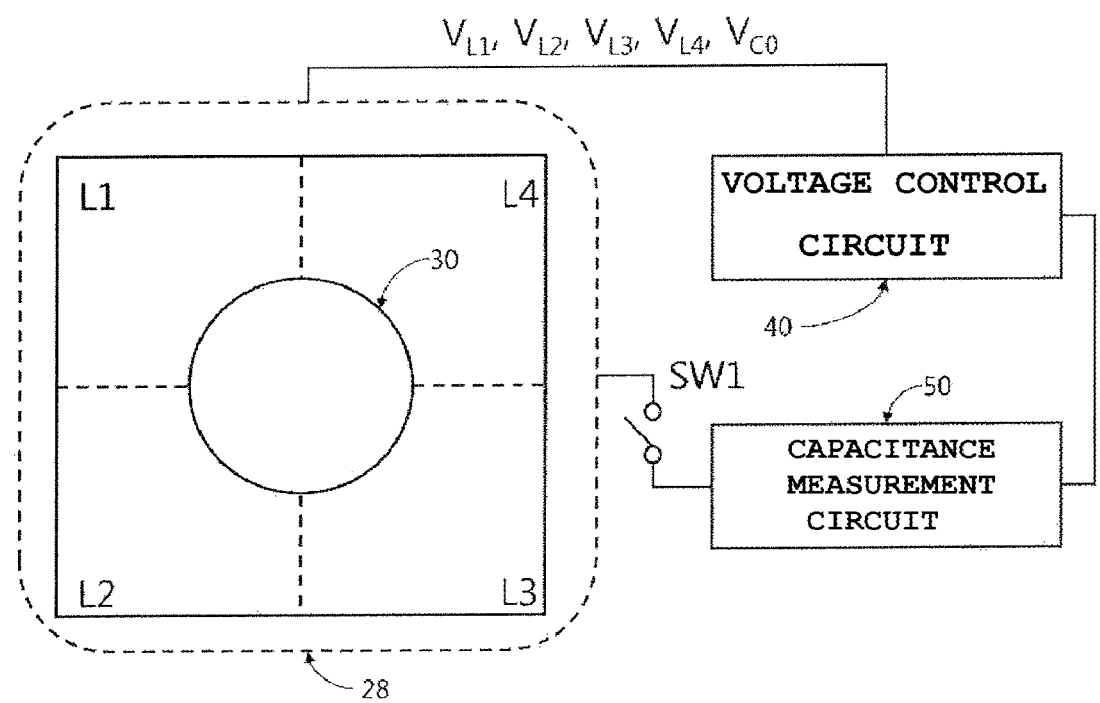

[FIG. 10]
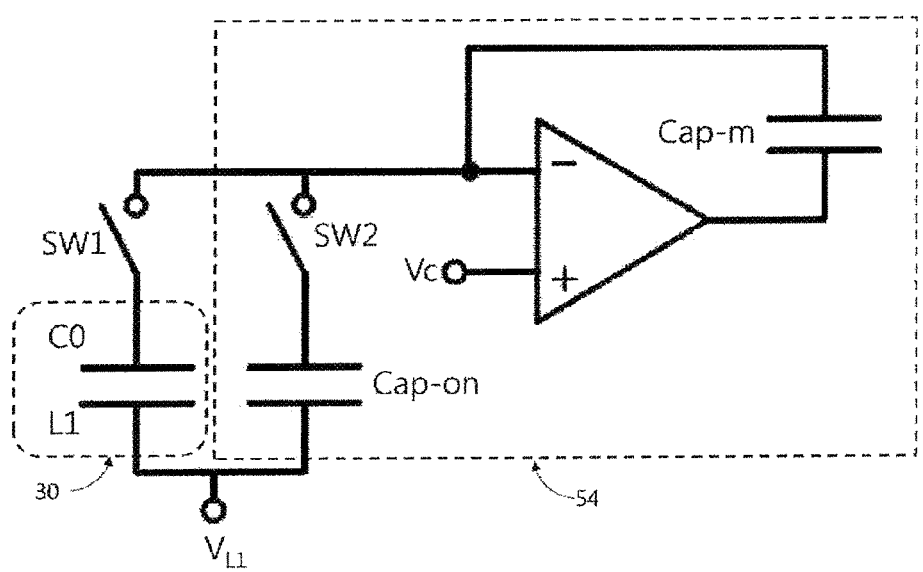

[FIG. 11]
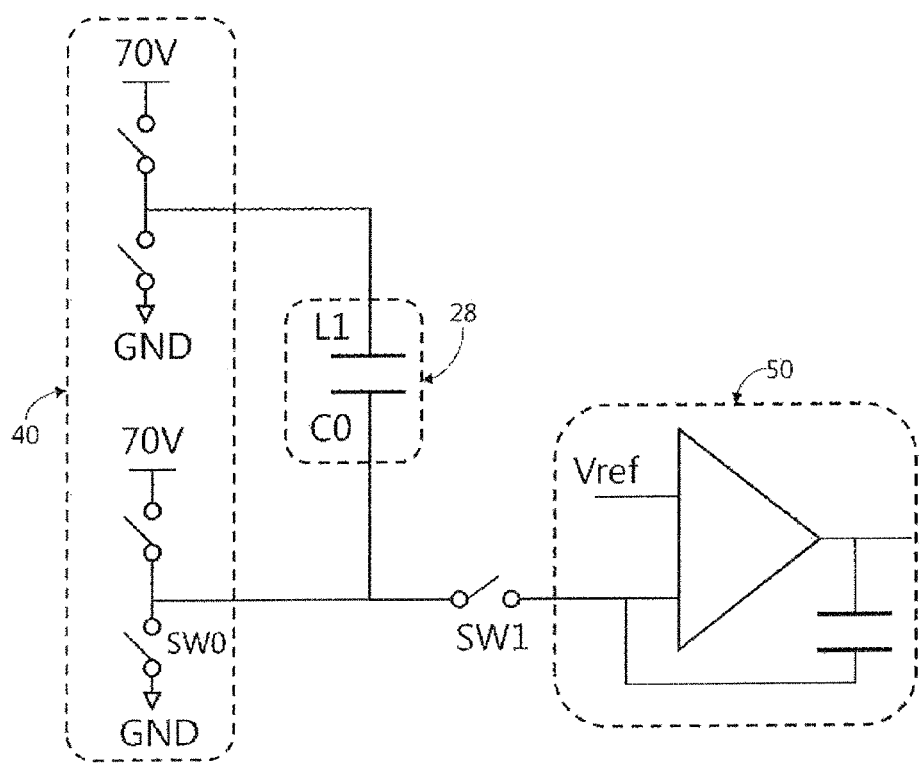

[FIG. 12]
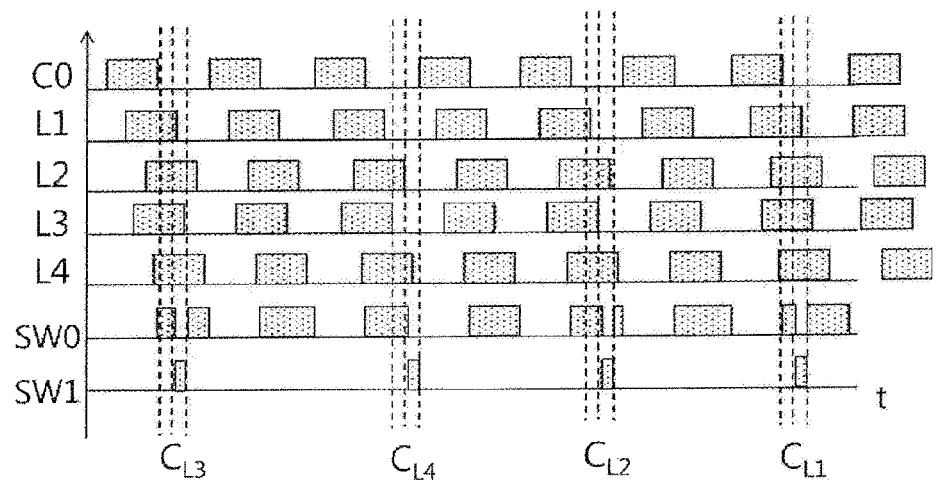

[FIG. 13]
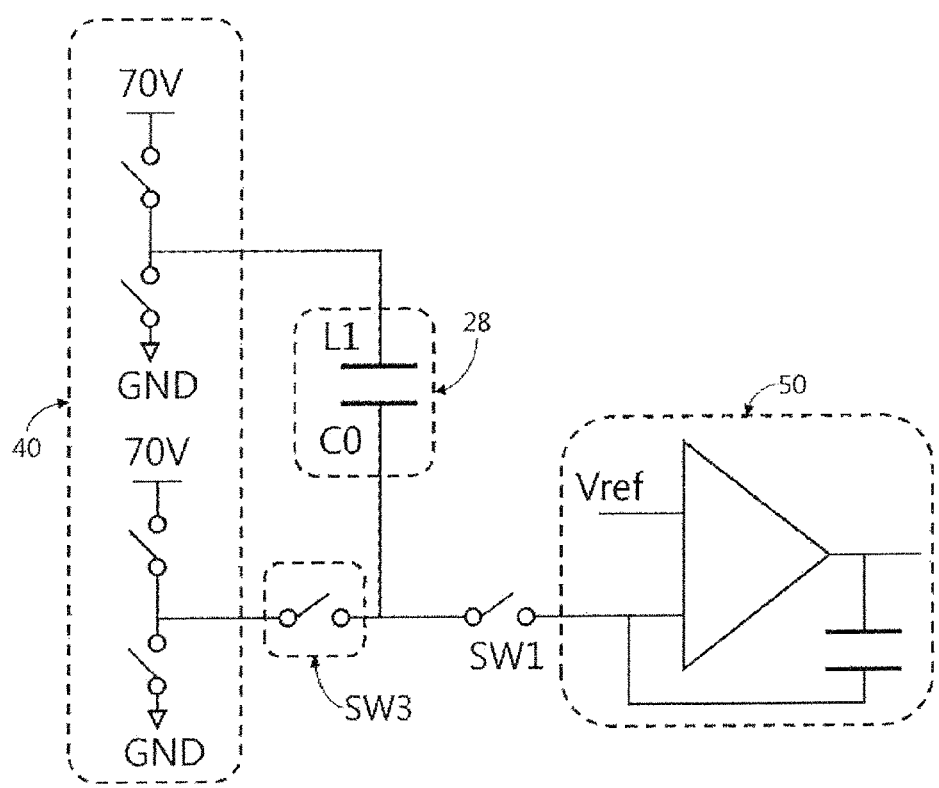

【FIG. 14】
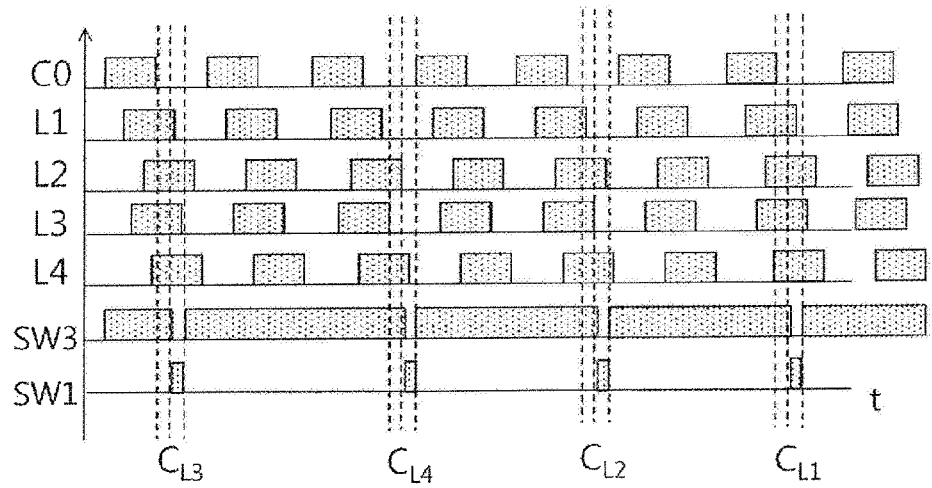
【FIG. 15】
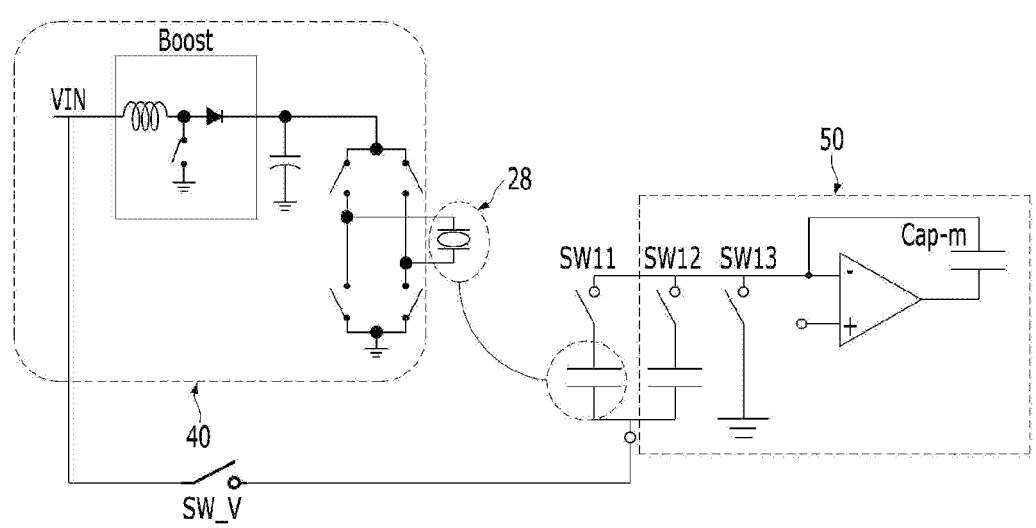

[FIG. 16]
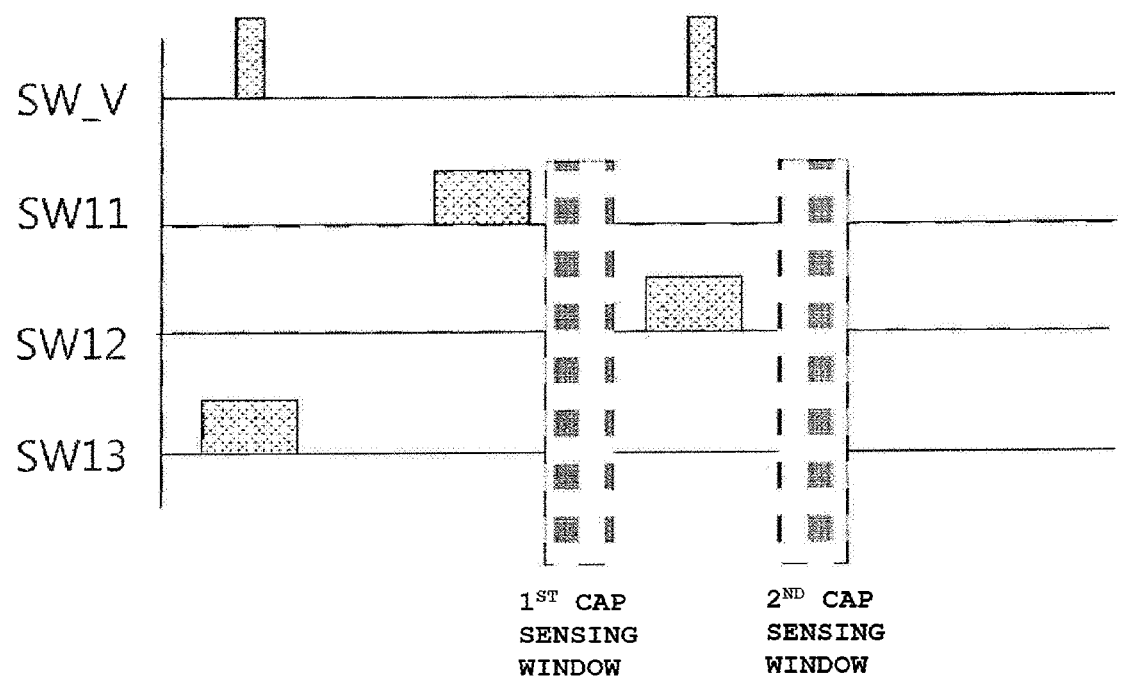

【FIG. 17】
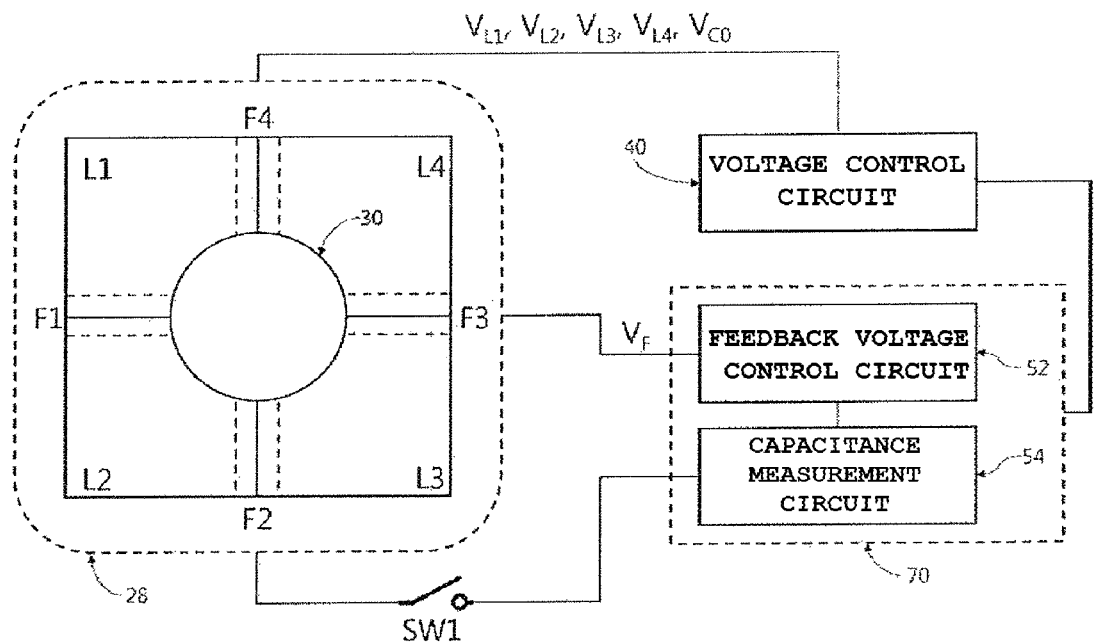
【FIG. 18】
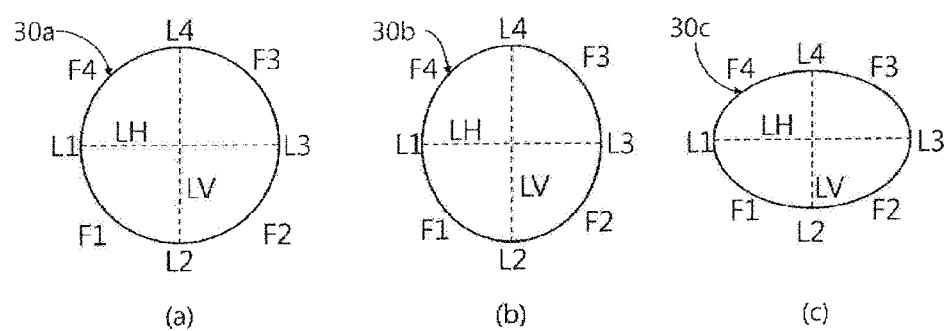
(a)　　　　　(b)　　　　　(c)

[FIG. 19]
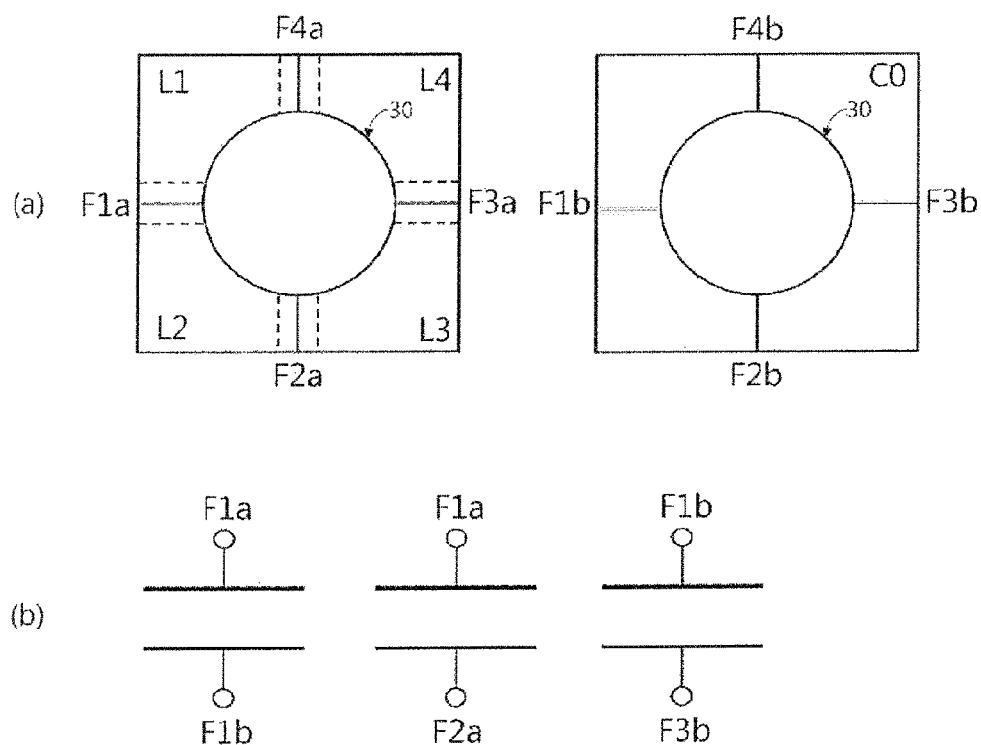

[FIG. 20]
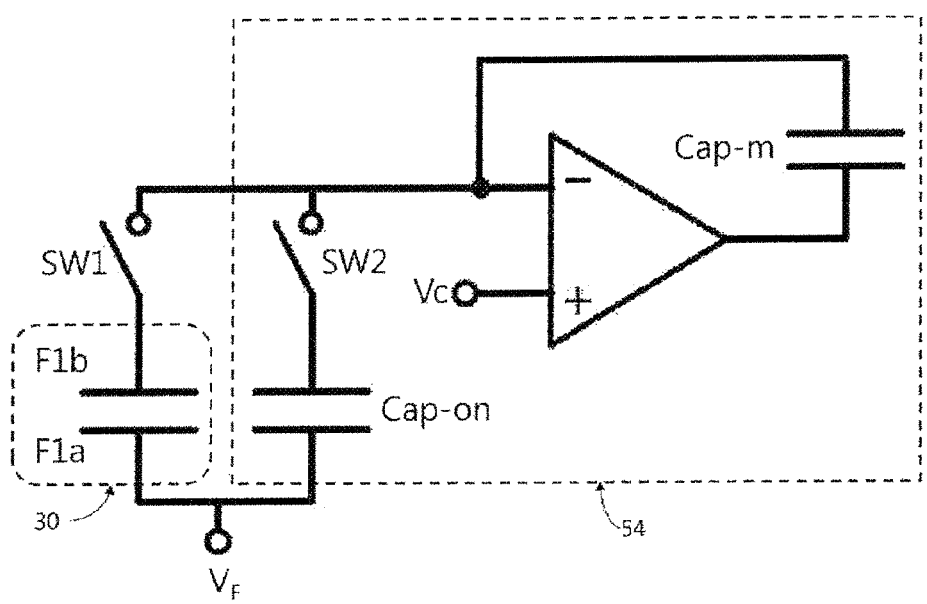

[FIG. 21]
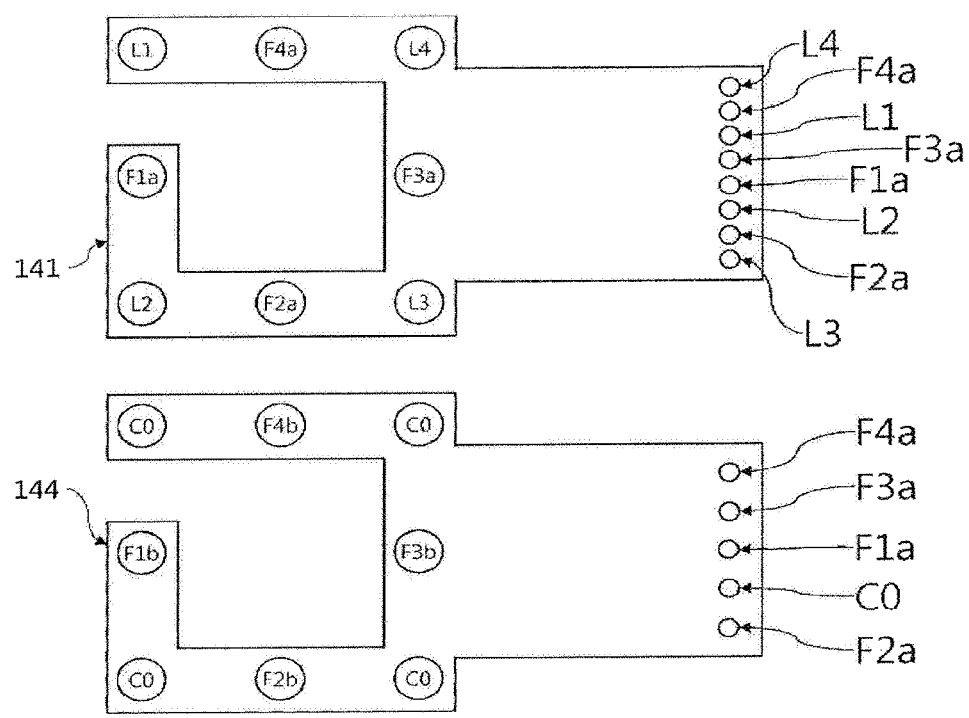

[FIG. 22]
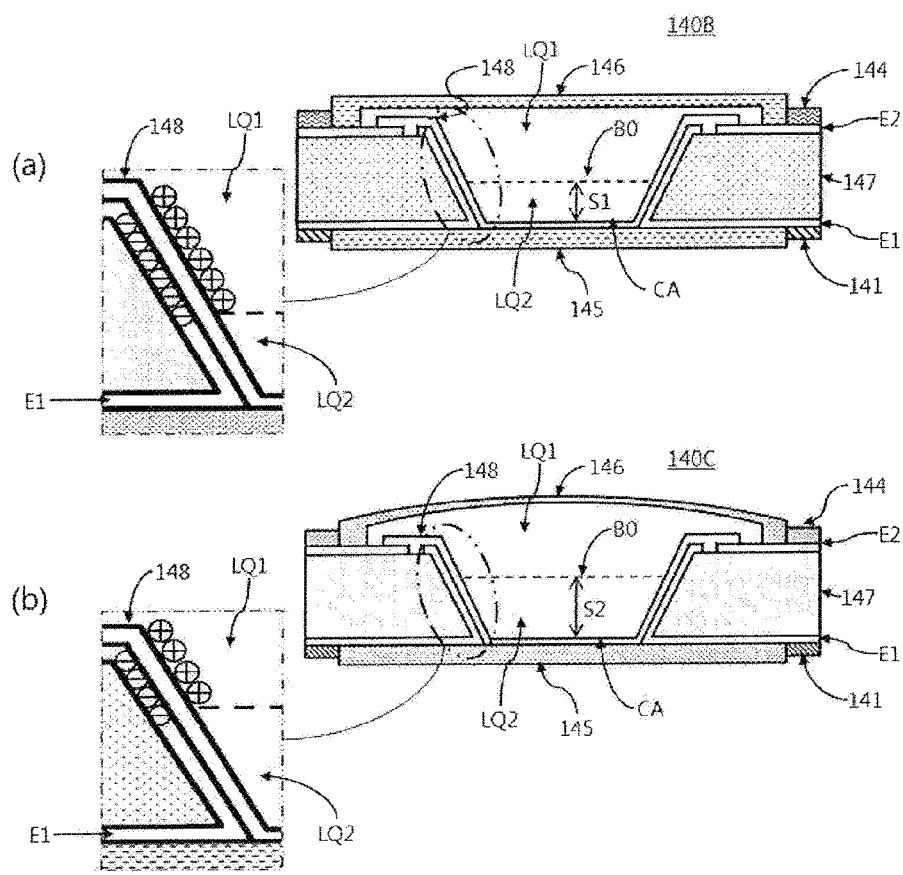

[FIG. 23]
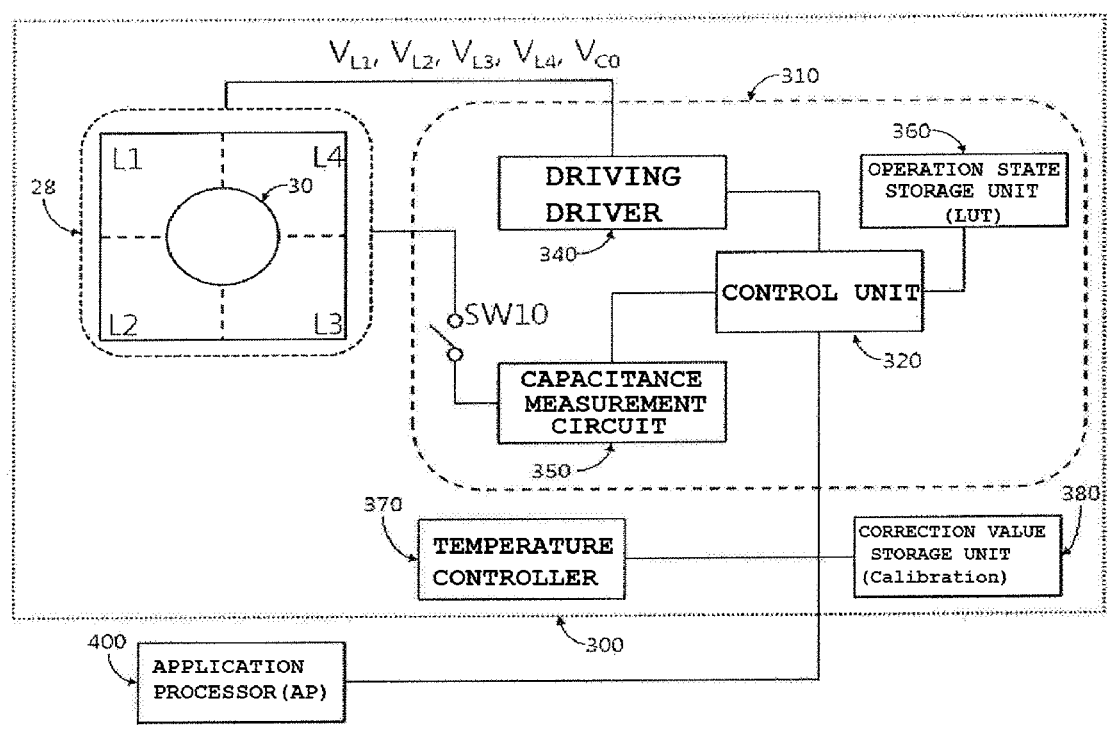

[FIG. 24]
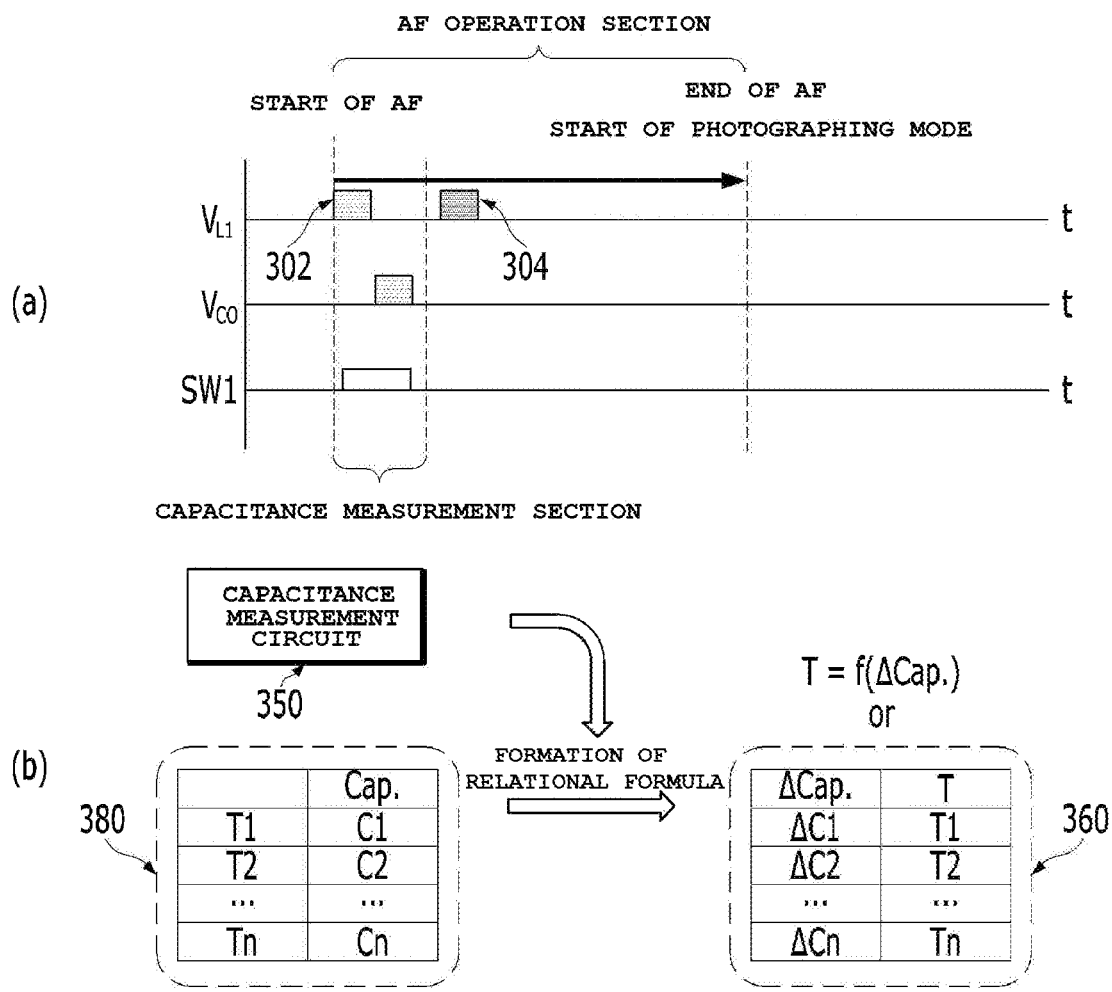

[FIG. 25]
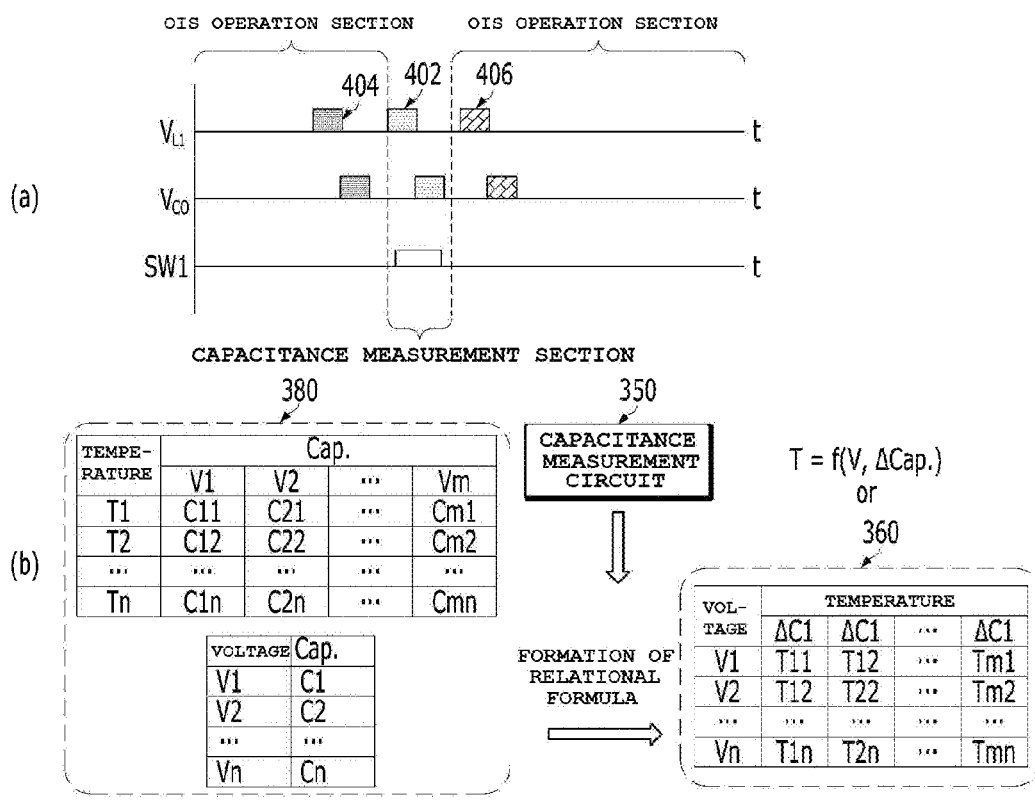

CAMERA MODULE

CROSS REFERENCE TO RELATED APPLICATIONS

This application is the National Phase of PCT International Application No. PCT/KR2019/005270, filed on May 2, 2019, which claims priority under 35 U.S.C. 119(a) to Patent Application No. 10-2018-0052032, filed in the Republic of Korea on May 4, 2018, all of which are hereby expressly incorporated by reference into the present application.

TECHNICAL FIELD

The present disclosure relates to a camera module. More particularly, the present disclosure relates to a camera module and an optical device, which include a control module or a control device for controlling a liquid lens enabling adjustment of a focal length using electrical energy.

BACKGROUND ART

People who use portable devices demand optical devices that have high resolution, are small, and have various photographing functions (e.g. an optical zoom-in/zoom-out function, an auto-focusing (AF) function, a hand-tremor compensation or optical image stabilizer (OIS) function, etc.). These photographing functions may be realized by directly moving a plurality of lenses that are combined. In the case in which the number of lenses is increased, however, the size of an optical device may be increased. The auto-focusing function and the hand-tremor compensation function are performed by moving or tilting several lens modules, which are fixed to a lens holder so as to be aligned with the optical axis, along the optical axis or in a direction perpendicular to the optical axis, and a separate lens-moving apparatus is used to move the lens modules. However, the lens-moving apparatus consumes a lot of power, and a cover glass needs to be provided separately from a camera module in order to protect the lens-moving apparatus, thus leading to an increase in the overall thickness. Therefore, research has been conducted on a liquid lens configured to electrically adjust the curvature of an interface between two types of liquids in order to perform the auto-focusing function and the hand-tremor compensation function.

DISCLOSURE

Technical Problem

The present disclosure may provide a feedback circuit capable of, in a camera device including a liquid lens enabling adjustment of a focal length using electrical energy, recognizing the state of an interface included in the liquid lens based on variation in capacitance, thereby enabling more accurate recognition of the movement of the interface of the liquid lens and the refractive index of the liquid lens corresponding to the electrical energy applied thereto and more accurate control of the interface of the liquid lens.

In addition, the present disclosure may provide a control circuit capable of compensating for variation in the refractive index of the liquid lens in response to variation in the temperature of the liquid lens.

In addition, the present disclosure may provide a control circuit capable of estimating and calculating the temperature of the liquid lens based on variation in the electrical characteristics of the liquid lens without a separate temperature sensor for measuring variation in the temperature of the liquid lens.

In addition, the present disclosure may enable more accurate control of the performance and operation of the liquid lens, which enables adjustment of a focal length, by directly recognizing the movement and shape of the interface of the liquid lens based on variation in the capacitance of the interface, rather than by converting an optical signal that has passed through the interface into an image.

In addition, the present disclosure may provide a camera device or an optical device capable of recognizing the movement and shape of the interface in the liquid lens, thereby more efficiently correcting distortion of a lens in a lens assembly including the liquid lens and a solid lens and controlling the lens assembly.

The objects to be accomplished by the disclosure are not limited to the above-mentioned objects, and other objects not mentioned herein will be clearly understood by those skilled in the art from the following description.

Technical Solution

A camera module according to an embodiment of the present disclosure may include a lens assembly including a liquid lens and at least one solid lens disposed above or below the liquid lens, the liquid lens including a plurality of individual electrodes and a common electrode, a driving driver configured to supply a voltage through the common electrode and at least one of the plurality of individual electrodes in the liquid lens in order to control an interface of the liquid lens, a capacitance measurement circuit configured to measure capacitance between the common electrode and at least one of the plurality of individual electrodes in the liquid lens, an operation state storage unit configured to store information on capacitance that varies depending on variation in temperature in the liquid lens, and a control unit configured to determine a temperature in the liquid lens based on the capacitance measured by the capacitance measurement circuit and the information. The liquid lens may further include a first plate including a cavity in which a conductive liquid and a non-conductive liquid are disposed, a second plate disposed on the first plate, and a third plate disposed under the first plate. The common electrode may be disposed on the first plate, and the plurality of individual electrodes may be disposed under the first plate.

In addition, the camera module may further include a first switch disposed between the liquid lens and the capacitance measurement circuit, and the first switch may be turned on for a time period equal to or shorter than the time taken to obtain one image frame through an image sensor.

In addition, the control unit may measure capacitance of the liquid lens through the capacitance measurement circuit at the time of commencement of an auto-focusing operation.

In addition, the time of commencement of the auto-focusing operation may be a time at which a focal length is set to infinity.

In addition, the control unit may stop an auto-focusing or optical image stabilizer operation to measure capacitance of the liquid lens through the capacitance measurement circuit, and may resume the auto-focusing or optical image stabilizer operation after measurement of the capacitance.

In addition, a voltage applied to measure capacitance of the liquid lens through the capacitance measurement circuit may have a predetermined fixed level.

In addition, a voltage applied to measure capacitance of the liquid lens through the capacitance measurement circuit may have a level different from the level of a voltage applied to control the interface.

In addition, the camera module may further include a distance sensor configured to measure the focal length to an object. The control unit may transfer a voltage corresponding to the focal length to the liquid lens via the driving driver, and the capacitance measurement circuit may measure capacitance of the liquid lens.

In addition, the operation state storage unit may store information on capacitance that varies depending on variation in temperature in the liquid lens and a voltage supplied from the driving driver.

In addition, the camera module may further include a correction value storage unit configured to store electrical characteristics or optical characteristics of the liquid lens and the at least one solid lens in the lens assembly.

The above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

The effects of a device according to the present disclosure will be described below.

The present disclosure may provide a method and a device capable of more accurately measuring the temperature of a liquid lens and the movement and change of an interface.

In addition, the present disclosure may detect variation in the refractive index corresponding to the movement of the interface in the liquid lens and to the shape of the liquid lens based on the electrical characteristics of the liquid lens, thereby more efficiently achieving optical stabilization of a video or image obtained by converting an optical signal transmitted through the liquid lens.

In addition, the present disclosure may recognize variation in refractive index corresponding to movement of the interface in the liquid lens and to the shape of the liquid lens, thereby improving the quality of an image obtained through a camera device or an optical device that includes a lens assembly including the liquid lens and a solid lens.

The effects achievable through the disclosure are not limited to the above-mentioned effects, and other effects not mentioned herein will be clearly understood by those skilled in the art from the following description.

DESCRIPTION OF DRAWINGS

FIG. 1 illustrates a schematic side view of a camera module according to an embodiment.

FIG. 2 illustrates an exploded perspective view of an embodiment of the camera module shown in FIG. 1.

FIG. 3 illustrates a cross-sectional view of the camera module shown in FIG. 2.

FIG. 4 is a view for explaining the holder and the liquid lens unit shown in FIGS. 1 and 3.

FIG. 5 illustrates a cross-sectional view of an embodiment of the liquid lens unit including the liquid lens according to the embodiment described above.

FIG. 6 is a schematic block diagram of the camera module.

FIGS. 7(a) and (b) are views for explaining a liquid lens, the interface of which is adjusted in response to a driving voltage.

FIG. 8 illustrates variation in the interface in the liquid lens.

FIG. 9 illustrates a control circuit, which is interlocked with the liquid lens.

FIG. 10 illustrates an example of a capacitance measurement circuit.

FIG. 11 illustrates a first example of the control circuit.

FIG. 12 illustrates the operation of the control circuit in FIG. 11.

FIG. 13 illustrates a second example of the control circuit.

FIG. 14 illustrates the operation of the control circuit in FIG. 13.

FIG. 15 illustrates the connection between the liquid lens and the control circuit.

FIG. 16 illustrates the timing of the switching elements illustrated in FIG. 15 in order to measure the capacitance of the liquid lens.

FIG. 17 illustrates a feedback circuit, which is interlocked with the liquid lens.

FIG. 18 illustrates variation in the interface in the liquid lens.

FIG. 19 illustrates an electrode structure of the liquid lens.

FIG. 20 illustrates an example of the capacitance measurement circuit.

FIG. 21 illustrates a connection unit of the liquid lens.

FIG. 22 illustrates variation in the liquid lens depending on variation in temperature.

FIG. 23 illustrates a camera module capable of responding to variation in temperature.

FIG. 24 illustrates a first method of determining the temperature by measuring the capacitance of the lens.

FIG. 25 illustrates a second method of determining the temperature by measuring the capacitance of the lens.

BEST MODE

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

The terms used in the present specification are used for explaining a specific exemplary embodiment, not to limit the present disclosure. Singular expressions include plural expressions unless clearly specified otherwise in context. In the specification, the terms "comprising" or "including" shall be understood to designate the presence of features, numbers, steps, operations, elements, parts, or combinations thereof, but not to preclude the presence or addition of one or more other features, numbers, steps, operations, elements, parts, or combinations thereof.

Unless otherwise defined, all terms including technical and scientific terms used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a lens assembly and a camera module including the same according to embodiments will be described using the Cartesian coordinate system, but the embodiments are not limited thereto. That is, in the Cartesian coordinate system, the x-axis, the y-axis and the z-axis are perpendicular to one another, but the embodiments are not limited thereto. That is, the x-axis, the y-axis, and the z-axis may cross one another, rather than being perpendicular to one another.

Hereinafter, a camera module 100 according to an embodiment will be described with reference to FIGS. 1 to 4.

FIG. 1 illustrates a schematic side view of the camera module 100 according to an embodiment.

Referring to FIG. 1, the camera module 100 may include a lens assembly 22, a control circuit 24, and an image sensor 26.

First, the lens assembly 22 may include a plurality of lens units and a holder in which the plurality of lens units is accommodated. As will be described below, the plurality of lens units may include a liquid lens, and may further include a first lens unit or a second lens unit. The plurality of lens units may include first and second lens units and a liquid lens unit.

The control circuit 24 serves to supply a driving voltage (or an operation voltage) to the liquid lens unit.

The control circuit 24 and the image sensor 26 described above may be disposed on a single printed circuit board (PCB), but this is merely given by way of example, and the embodiment is not limited thereto.

When the camera module 100 according to the embodiment is applied to an optical device (or an optical instrument), the configuration of the control circuit 24 may be designed in different ways depending on the specifications required in the optical device. In particular, the control circuit 24 may be implemented as a single chip so as to reduce the magnitude of the driving voltage applied to the lens assembly 22. Thereby, the size of an optical device mounted in a portable device may be further reduced.

FIG. 2 illustrates an exploded perspective view of an embodiment of the camera module 100 shown in FIG. 1.

Referring to FIG. 2, the camera module 100 may include a lens assembly, a main board 150, and an image sensor 182. In addition, the camera module 100 may further include a first cover 170 and a middle base 172. In addition, the camera module 100 may further include at least one adhesive member. The at least one adhesive member serves to couple or fix a liquid lens unit 140 to a holder 120. In addition, the camera module 100 may further include a sensor base 178 and a filter 176, or may not include the sensor base 178 and the filter 176, unlike FIG. 2. In addition, the camera module 100 may further include a circuit cover 154. The circuit cover 154 may have an electromagnetic shielding function.

According to the embodiment, at least one of the components 110 to 176 of the camera module 100 shown in FIG. may be omitted. Alternatively, at least one component different from the components 110 to 176 shown in FIG. 2 may be further included in the camera module 100.

FIG. 3 is a cross-sectional view of the camera module 100 shown in FIG. 2. That is, FIG. 3 is a cross-sectional view taken along line A-A' in the camera module 100 shown in FIG. 2. For convenience of description, the first cover 170, the circuit cover 154, and the connector 153 shown in FIG. 2 are not illustrated in FIG. 3, and may in practice be omitted from the camera module 100.

Referring to FIGS. 2 and 3, the lens assembly may include at least one of the liquid lens unit 140, the holder 120, a first lens unit 110 or 110A, or a second lens unit 130 or 130A, and may correspond to the lens assembly 22 shown in FIG. 1. The lens assembly may be disposed on the main board 150.

In the lens assembly, the first lens unit 110 and the second lens unit 130 may be referred to as a 'first solid lens unit' and a 'second solid lens unit', respectively, in order to be distinguished from the liquid lens unit 140.

The first lens unit 110 may be disposed at the upper side of the lens assembly, and may be a region on which light is incident from outside the lens assembly. That is, the first lens unit 110 or 110A may be disposed above the liquid lens unit 140 within the holder 120. The first lens unit 110 or 110A may be implemented using a single lens, or may be implemented using two or more lenses that are aligned along a center axis to form an optical system.

Here, the center axis may be an optical axis LX of the optical system, which is formed by the first lens unit 110 or 110A, the liquid lens unit 140, and the second lens unit 130 or 130A included in the camera module 100, or may be an axis parallel to the optical axis LX. The optical axis LX may correspond to the optical axis of the image sensor 182. That is, the first lens unit 110 or 110A, the liquid lens unit 140, the second lens unit 130 or 130A, and the image sensor 182 may be aligned along the optical axis LX through active alignment (AA).

Here, active alignment may mean an operation of aligning the optical axes of the first lens unit 110 or 110A, the second lens unit 130 or 130A, and the liquid lens unit 140 with each other and adjusting an axial relationship or distance relationship between the image sensor 182 and the lens units 110 or 110A, 130 or 130A, and 140 in order to acquire an improved image.

In an embodiment, active alignment may be performed through an operation of analyzing image data generated by the image sensor 182, which receives light introduced from a specific object via at least one of the first lens unit 110 or 110A, the second lens unit 130 or 130A, or the liquid lens unit 140. For example, active alignment may be performed in the following sequence.

In one example, after active alignment (first alignment), which adjusts relative positions between the first lens unit 110 or 110A and the second lens unit 130 or 130A, which are fixedly mounted to the holder 120, and the image sensor 182, is completed, active alignment (second alignment), which adjusts relative positions between the liquid lens unit 140, which is inserted into the holder 120, and the image sensor 182, may be performed. The first alignment may be performed as a gripper grips the middle base 172 and displaces the middle base 172 to various positions, and the second alignment may be performed as the gripper grips a spacer 143 of the liquid lens unit 140 and displaces the spacer to various positions.

However, active alignment may be performed in any other sequence different from the above-described sequence.

Assuming the case in which the middle base 172 is omitted, active alignment may be performed in the state in which the gripper grips a protruding portion 124 of the holder 120. At this time, when the protruding portion 124 has a small thickness, active alignment may not be accurately performed. In order to prevent this, the camera module 100 may include the middle base 172, which is thicker than the protruding portion 124 of the holder 120. Management of the thickness of the holder 120 may be necessary in order to form the holder 120, which has a complicated shape compared to the shape of the middle base 172, using injection molding or the like. When the thickness of a portion of the holder 120 for active alignment is not sufficient for gripping, the middle base 172 may be added so that active alignment may be performed in the state in which the gripper grips a portion of the middle base 172. However, when the thickness of the protruding portion 124 is sufficiently large, the middle base 172 may be omitted. In addition, the protruding portion 124 and the middle base 172 may be coupled to each other using an adhesive member, for example, epoxy.

In another example, after active alignment (third alignment), which adjusts relative positions between the first lens unit 110 or 110A, the second lens unit 130 or 130A, and the liquid lens unit 140, which are fixedly mounted to the holder 120, is completed, active alignment (fourth alignment), which adjusts relative positions between the lenses of the lens assembly, which have completely undergone the third alignment, and the image sensor 182 may be performed. The third alignment may be performed as a gripper grips the spacer 143 of the liquid lens unit 140 and displaces the spacer to various positions, and the fourth alignment may be performed as the gripper grips the middle base 172 and displaces the middle base to various positions.

In addition, as illustrated in FIG. 3, the first lens unit 110A may include, for example, two lenses L1 and L2, but this is merely given by way of example, and the first lens unit 110A may include one lens, or three or more lenses.

In addition, an exposure lens may be disposed at the upper side of the first lens unit 110 or 110A. Here, the exposure lens may be the outermost lens among the lenses included in the first lens unit 110 or 110A. That is, the lens L1 located at the uppermost side of the first lens unit 110A may protrude upwards, and therefore, may function as the exposure lens. The exposure lens faces the risk of damage to the surface thereof since it protrudes outwards from the holder 120. When the surface of the exposure lens is damaged, the quality of an image captured by the camera module 100 may be deteriorated. Therefore, in order to prevent or minimize damage to the surface of the exposure lens, a cover glass may be disposed, or a coating layer may be formed on the top of the exposure lens. Alternatively, in order to prevent damage to the surface of the exposure lens, the exposure lens may be formed of a wear-resistant material having higher rigidity than the lenses of the other lens units.

In addition, the outer diameter of each of the lenses L1 and L2 included in the first lens unit 110A may gradually increase in a direction approaching the bottom (e.g. in the −z-axis direction), but the embodiment is not limited thereto.

FIG. 4 is a view for explaining the holder 120 and the liquid lens unit 140 shown in FIGS. 2 and 3. That is, FIG. 4 illustrates an exploded perspective view of the holder 120 and the liquid lens unit 140. The holder 120 shown in FIG. 4 may include first and second holes H1 and H2 and first to fourth sidewalls.

FIG. 2 illustrates a plan view of the state before a first connection substrate 141 and a second connection substrate 144 are bent in the −z-axis direction, and FIG. 4 illustrates the state after the first connection substrate 141 is bent in the −z-axis direction. Further, as shown in FIG. 3, the spacer 143 may be disposed between the first connection substrate 141 and the second connection substrate 144, and may be disposed so as to protrude from at least one of a first or second opening OP1 or OP2 in the holder 120.

In addition, the spacer 143 may be disposed so as to surround the side surface of the liquid lens 142 in a ring shape. The spacer 143 may include, at the upper portion and the lower portion thereof, uneven portions in order to increase coupling force with the connection substrates 141 and 144 using an adhesive material. The connection substrates 141 and 144 may have a shape corresponding to the shape of the spacer 143, and may include a ring shape.

The first and second holes H1 and H2 may be formed respectively in the upper portion and the lower portion of the holder 120 to open the upper portion and the lower portion of the holder 120, respectively. Here, the first hole H1 and the second hole H2 may be through-holes. The first lens unit 110 or 110A may be accommodated in, mounted in, seated in, in contact with, fixed to, provisionally fixed to, supported by, coupled to, or disposed in the first hole H1, which is formed in the holder 120, and the second lens unit 130 or 130A may be accommodated in, mounted in, seated in, in contact with, fixed to, provisionally fixed to, supported by, coupled to, or disposed in the second hole H2, which is formed in the holder 120.

In addition, the first and second sidewalls of the holder 120 may be disposed so as to face each other in a direction perpendicular to the direction of the optical axis LX (e.g. in the x-axis direction), and the third and fourth sidewalls may be disposed so as to face each other in a direction perpendicular to the direction of the optical axis LX (e.g. in the y-axis direction). In addition, as illustrated in FIG. 4, the first sidewall of the holder 120 may include a first opening OP1, and the second sidewall thereof may include a second opening OP2 having a shape that is the same as or similar to that of the first opening OP1. Thus, the first opening OP1 disposed in the first sidewall and the second opening OP2 disposed in the second sidewall may be disposed so as to face each other in a direction perpendicular to the direction of the optical axis LX (e.g. in the x-axis direction).

The inner space in the holder 120, in which the liquid lens unit 140 is disposed, may be open due to the first and second openings OP1 and OP2. In this case, the liquid lens unit 140 may be inserted through the first or second opening OP1 or OP2 so as to be mounted in, seated in, in contact with, fixed to, provisionally fixed to, supported by, coupled to, or disposed in the inner space in the holder 120. For example, the liquid lens unit 140 may be inserted into the inner space in the holder 120 through the first opening OP1.

As such, in order to allow the liquid lens unit 140 to be inserted into the inner space in the holder 120 through the first or second opening OP1 or OP2, the size of the first or second opening OP1 or OP2 in the holder 120 in the direction of the optical axis LX may be greater than the cross-sectional area of the liquid lens unit 140 in the y-axis direction and the z-axis direction. For example, the height H corresponding to the size of each of the first and second openings OP1 and OP2 in the direction of the optical axis LX may be greater than the thickness TO of the liquid lens unit 140.

The second lens unit 130 or 130A may be disposed below the liquid lens unit 140 within the holder 120. The second lens unit 130 or 130A may be spaced apart from the first lens unit 110 or 110A in the optical-axis direction (e.g. in the z-axis direction).

The light introduced into the first lens unit 110 or 110A from outside the camera module 100 may pass through the liquid lens unit 140 and may be introduced into the second lens unit 130 or 130A. The second lens unit 130 or 130A may be implemented using a single lens, or may be implemented using two or more lenses, which are aligned along the center axis to form an optical system. For example, as illustrated in FIG. 3, the second lens unit 130A may include three lenses L3, L4 and L5, but this is merely given by way of example, and two or less lenses or four or more lenses may be included in the second lens unit 130 or 130A.

In addition, the outer diameter of each of the lenses L3, L4 and L5 included in the second lens unit 130A may gradually increase in a direction approaching the bottom (e.g. in the −z-axis direction), but the embodiment is not limited thereto.

Unlike the liquid lens unit 140, each of the first lens unit 110 or 110A and the second lens unit 130 or 130A may be a solid lens formed of glass or plastic, but the embodiment is not limited as to a specific material of each of the first lens unit 110 or 110A and the second lens unit 130 or 130A.

In addition, referring to FIG. 3, the liquid lens unit 140 may include first to fifth areas A1, A2, A3, A4 and A5.

The first area A1 is an area disposed inside the first opening OP1 in the holder 120, the second area A2 is an area disposed inside the second opening OP2 in the holder 120, and the third area A3 is an area between the first area A1 and the second area A2. The fourth area A4 is an area protruding from the first opening OP1 in the holder 120 and disposed outside the holder 120 at the side of the first opening OP1. The fifth area A5 is an area protruding from the second opening OP2 in the holder 120 and disposed outside the holder 120 at the side of the second opening OP2.

In addition, as shown in FIG. 2, the liquid lens unit 140 may include a first connection substrate (or an individual electrode connection substrate) 141, a liquid lens (or a liquid lens body) 142, the spacer 143, and a second connection substrate (or a common electrode connection substrate) 144.

The first connection substrate 141 may electrically connect a plurality of first electrodes (not shown) included in the liquid lens 142 to the main board 150, and may be disposed above the liquid lens 142. The first connection substrate 141 may be implemented as a flexible printed circuit board (FPCB).

In addition, the first connection substrate 141 may be electrically connected to an electrode pad (not shown), which is formed on the main board 150, via a connection pad (not shown), which is electrically connected to each of a plurality of first electrodes. To this end, after the liquid lens unit 140 is inserted into the inner space of the holder 120, the first connection substrate 141 may be subjected to bending in the −z-axis direction toward the main board 150, and thereafter the connection pad (not shown) and the electrode pad (not shown) may be electrically connected to each other via conductive epoxy. In another embodiment, the first connection substrate 141 may be connected to a first holder surface electrode, which is conductive and is disposed, formed, or coated on the surface of the holder 120, so as to be electrically connected to the main board 150 via the first holder surface electrode, which is conductive and is disposed on the surface of the holder 120, but the embodiment is not limited thereto.

The second connection substrate 144 may electrically connect a second electrode (not shown) included in the liquid lens 142 to the main board 150, and may be disposed below the liquid lens 142. The second connection substrate 144 may be implemented as an FPCB or a single metal substrate (a conductive metal plate). Here, the first and second electrodes will be described later in detail with reference to FIG. 5.

The second connection substrate 144 may be electrically connected to an electrode pad, which is formed on the main board 150, via a connection pad, which is electrically connected to the second electrode. To this end, after the liquid lens unit 140 is inserted into the inner space of the holder 120, the second connection substrate 144 may be subjected to bending in the −z-axis direction toward the main board 150. In another embodiment, the second connection substrate 144 may be connected to a second holder surface electrode, which is conductive and is disposed, formed, or coated on the surface of the holder 120, so as to be electrically connected to the main board 150 via the second holder surface electrode, which is conductive and is disposed on the surface of the holder 120, but the embodiment is not limited thereto.

The liquid lens 142 may include a cavity CA. As shown in FIG. 3, the open area in the direction in which light is introduced into the cavity CA may be smaller than the open area in the opposite direction. Alternatively, the liquid lens 142 may be disposed such that the direction of inclination of the cavity CA is opposite what is illustrated. That is, unlike the illustration of FIG. 3, the open area in the direction in which light is introduced into the cavity CA may be greater than the open area in the opposite direction. In addition, when the liquid lens 142 is disposed such that the direction of inclination of the cavity CA is opposite what is illustrated, the arrangement of all or some of the components included in the liquid lens 142 may be changed, or only the direction of inclination of the cavity CA may be changed and the arrangement of the remaining components may not be changed, according to the direction of inclination of the liquid lens 142. The concrete configuration of the liquid lens 142 will be described later in detail with reference to FIG. 5.

The spacer 143 may be disposed so as to surround the liquid lens 142, and may protect the liquid lens 142 from external impacts. To this end, the spacer 143 may have a shape that allows the liquid lens 142 to be mounted in, seated in, in contact with, fixed to, provisionally fixed to, supported by, coupled to, or disposed in the spacer.

For example, the spacer 143 may include a hollow region in which the liquid lens 142 is accommodated, and a frame configured to surround the hollow region formed in the center thereof. As such, the spacer 143 may have a centrally-hollowed square planar shape (hereinafter referred to as a '□'-shaped form), but the embodiment is not limited thereto.

In addition, the spacer 143 may be disposed between the first connection substrate 141 and the second connection substrate 144, and may be disposed so as to protrude from at least one of the first or second opening OP1 or OP2 in the holder 120. That is, at least a portion of the spacer 143 may be shaped so as to protrude, along with the first and second connection substrates 141 and 144, from at least one of the first or second sidewall of the holder 120 in the direction perpendicular to the optical axis LX (e.g. in the x-axis direction). The reason for this is that the length of the spacer 143 in the x-axis direction is greater than the length of the holder 120 in the x-axis direction. Thus, portions of the spacer 143, which protrude from the first and second sidewalls, may respectively correspond to the fourth area A4 and the fifth area A5 shown in FIG. 3.

In addition, the spacer 143 may be brought into contact with a gripper when the spacer 143 is inserted into the holder 120 and during active alignment.

In addition, at least a portion of the spacer 143 may be disposed in at least one of the first opening OP1 or the second opening OP2. In the case of FIG. 3, the spacer 143 is illustrated as not being disposed in the first opening OP1 and the second opening OP2. However, unlike the illustration, as illustrated in FIGS. 2 and 4, it can be appreciated that at least a portion of the spacer 143 is disposed in each of the first and second openings OP1 and OP2 since the spacer 143 has a '☐'-shaped form and surrounds the liquid lens 142.

In addition, at least a portion of the liquid lens 142 may be disposed in at least one of the first opening OP1 or the second opening OP2. Referring to FIG. 3, it can be appreciated that a first plate 147 of the liquid lens 142, which is a component of the liquid lens 142, is disposed in each of the first and second openings OP1 and OP2.

In addition, only at least a portion of the spacer 143 may be disposed in each of the first and second openings OP1 and OP2, and the liquid lens 142 may not be disposed therein.

In addition, referring to FIG. 3, the holder 120 may include a holder upper area 120U disposed above the liquid lens unit 140 and a holder lower area 120D disposed below the liquid lens unit 140. In this case, each of the first and second adhesive members may couple each of the holder upper area 120U and the holder lower area 120D to the liquid lens unit 140.

The first cover 170 may be disposed so as to surround the holder 120, the liquid lens unit 140, and the middle base 172, and may protect these components 120, 140 and 172 from external impacts. In particular, since the first cover 170 is disposed, a plurality of lenses, which forms an optical system, may be protected from external impacts.

In addition, in order to allow the first lens unit 110 or 110A disposed in the holder 120 to be exposed to external light, the first cover 170 may include an upper opening 170H formed in the upper surface of the first cover 170.

In addition, a window formed of a light-transmitting material may be disposed in the upper opening 170H, whereby it is possible to prevent foreign substances such as dust or moisture from entering the camera module 100.

In addition, the first cover 170 may be disposed so as to cover the upper surface and the first to fourth sidewalls of the holder 120.

Meanwhile, referring to FIGS. 2 and 3, the middle base 172 may be disposed so as to surround the second hole H2 in the holder 120. To this end, the middle base 172 may include an accommodating hole 172H for accommodating the second hole H2 therein. The inner diameter of the middle base 172 (i.e. the diameter of the accommodating hole 172H) may be equal to or greater than the outer diameter of the second hole H2.

Here, each of the accommodating hole 172H in the middle base 172 and the second hole H2 is illustrated as having a circular shape, but the embodiment is not limited thereto, and these holes may be changed to various other shapes.

In the same manner as the upper opening 170H in the first cover 170, the accommodating hole 172H may be formed near the center of the middle base 172 at a position corresponding to the position of the image sensor 182, which is disposed in the camera module 100.

The middle base 172 may be mounted on the main board 150 so as to be spaced apart from a circuit element 151 on the main board 150. That is, the holder 120 may be disposed on the main board 150 so as to be spaced apart from the circuit element 151.

The main board 150 may be disposed below the middle base 172, and may include a recess in which the image sensor 182 may be mounted, seated, tightly disposed, fixed, provisionally fixed, supported, coupled, or accommodated, the circuit element 151, a connection part (or an FPCB) 152, and a connector 153.

The circuit element 151 of the main board 150 may constitute a control module, which controls the liquid lens unit 140 and the image sensor 182. Here, the circuit element 151 may include at least one of a passive element or an active element, and may have any of various areas and heights. The circuit element 151 may be provided in a plural number, and may have a height greater than the height of the main board 150 so as to protrude outwards. The plurality of circuit elements 151 may be disposed so as not to overlap the holder 120 in the direction parallel to the optical axis LX. For example, the plurality of circuit elements 151 may include a power inductor, a gyro sensor, and the like, but the embodiment is not limited as to a specific type of the circuit elements 151.

The main board 150 may include a holder area in which the holder 120 is disposed and an element area in which the plurality of circuit elements 151 is disposed.

The main board 150 may be implemented as a rigid flexible printed circuit board (RFPCB) including the FPCB 152. The FPCB 152 may be subjected to bending depending on the requirement of the space in which the camera module 100 is mounted.

The image sensor 182 may perform a function of converting the light that has passed through the first lens unit 110, the liquid lens unit 140, and the second lens unit 130 of the lens assembly 110, 120, 130 and 140 into image data. More specifically, the image sensor 182 may generate image data by converting light into analog signals via a pixel array including a plurality of pixels and synthesizing digital signals corresponding to the analog signals.

Meanwhile, the connector 153 may electrically connect the main board 150 to a power supply or some other devices (e.g. an application processor) outside the camera module 100.

Hereinafter, an embodiment of a method of manufacturing the camera module 100 will be described with reference to the accompanying drawings.

First, the image sensor 182 may be mounted on the main board 150, and the holder 120 in which the middle base 172 and the second cover 174 are coupled or disposed may be mounted on, seated on, in contact with, provisionally fixed to, supported by, coupled to, or disposed on the main board 150.

At this time, active alignment (first alignment) between the first lens unit 110 or 110A and the second lens unit 130 or 130A, which are mounted in the holder 120, and the image sensor 182 may be performed. The first alignment may be performed by adjusting the positions of the middle base 172 and the holder 120 while supporting opposite sides of the middle base 172. The first alignment may be performed while moving a jig, which presses and fixes opposite sides of the middle base 172. The middle base 172 may be fixed to the main board 150 in the completed state of the first alignment.

Subsequently, the liquid lens unit 140 may be inserted into the holder 120 through at least one of the first opening OP1 or the second opening OP2 in the holder 120, and active alignment between the liquid lens unit 140 and the image sensor 182 may be performed as second alignment. The second alignment may be performed by adjusting the position of the liquid lens unit 140 while supporting the liquid lens unit 140 in the x-axis direction. The second alignment may be performed while moving a jig, which presses and fixes the liquid lens unit 140 in the x-axis direction.

Subsequently, each of the first connection substrate 141 and the second connection substrate 144 may be subjected to bending so as to be electrically connected to the main board 150. After the bending process, a soldering process is performed to electrically connect each of the first connection substrate 141 and the second connection substrate 144 to the main board 150.

Subsequently, the first lens unit 110, the holder 120, the second lens unit 130, the liquid lens unit 140, and the middle base 172 are covered with the first cover 170 so as to complete the camera module 100.

Meanwhile, some of the plurality of circuit elements 151 shown in FIG. 2 may cause electromagnetic interference (EMI) or noise. In particular, among the plurality of circuit elements 151, a power inductor 151-1 may cause greater EMI than other elements. In order to block EMI or noise, the circuit cover 154 may be disposed so as to cover the circuit elements 151 disposed in the element area of the main board 150.

In addition, when the circuit cover 154 is disposed so as to cover the circuit elements 151, the circuit elements 151 disposed on the main board 150 may be protected from external impacts. To this end, the circuit cover 154 may include an accommodating space for accommodating therein and covering the circuit elements 151, in consideration of the shape and position of the circuit elements 151 disposed on the main board 150.

Meanwhile, the filter 176 may filter light within a specific wavelength range, among the light that has passed through the first lens unit 110 or 110A, the liquid lens unit 140, and the second lens unit 130 or 130A. The filter 176 may be an infrared (IR) light blocking filter or an ultraviolet (UV) light blocking filter, but the embodiment is not limited thereto. The filter 176 may be disposed above the image sensor 182. The filter 176 may be disposed inside the sensor base 178. For example, the filter 176 may be disposed or mounted in an inner recess in the sensor base 178 or on a stepped portion thereof.

The sensor base 178 may be disposed below the middle base 172, and may be attached to the main board 150. The sensor base 178 may surround the image sensor 182, and may protect the image sensor 182 from foreign substances or external impacts.

The main board 150 may be disposed below the sensor base 178, the sensor base 178 may be mounted on the main board 150 so as to be spaced apart from the circuit elements 151, and the holder 120 in which the middle base 172, the second lens unit 130 or 130A, the liquid lens unit 140, and the first lens unit 110 or 110A are disposed may be disposed above the sensor base 178.

In addition, the camera module 100 shown in FIG. 2 may not include the sensor base 178 and the filter 176.

Hereinafter, an embodiment 140A of the liquid lens unit 140 included in the camera module 100 according to the embodiment described above will be described with reference to FIG. 5. FIG. 5 illustrates a cross-sectional view of the embodiment 140A of the liquid lens unit 140 including the liquid lens according to the embodiment described above.

Each of the liquid lens unit 140A shown in FIG. 5 may include the first connection substrate 141, the liquid lens 142, the spacer 143, and the second connection substrate 144. The spacer 143 has been described above, and thus a duplicate description thereof will be omitted. For convenience of description, illustration of the spacer 143 is omitted from FIG. 5.

The liquid lens 142 may include a plurality of different types of liquids LQ1 and LQ2, first to third plates 147, 145 and 146, first and second electrodes E1 and E2, and an insulation layer 148. The liquid lens 142 may further include an optical layer (not shown).

The liquids LQ1 and LQ2 may be accommodated in the cavity CA, and may include a first liquid LQ1, which is conductive, and a second liquid (or an insulative liquid) LQ2, which is non-conductive. The first liquid LQ1 and the second liquid LQ2 may not mix with each other, and an interface BO may be formed on a contact portion between the first and second liquids LQ1 and LQ2. For example, the second liquid LQ2 may be disposed on the first liquid LQ1, but the embodiment is not limited thereto.

In addition, in the cross-sectional shape of the liquid lens 142, the edges of the first and second liquids LQ2 and LQ1 may be thinner than the center portions thereof.

The inner side surface of the first plate 147 may form a sidewall i of the cavity CA. The first plate 147 may include upper and lower openings having a predetermined inclined surface. That is, the cavity CA may be defined as an area that is surrounded by the inclined surface of the first plate 147, a third opening that is in contact with the second plate 145, and a fourth opening that is in contact with the third plate 146.

The diameter of a wider opening among the third and fourth openings may be changed depending on the field of view (FOV) required for the liquid lens 142 or the role of the liquid lens 142 in the camera module 100A. According to the embodiment, the size (the area or the width) of the fourth opening $O_2$ may be greater than the size (the area or the width) of the third opening $O_1$. Here, the size of each of the third and fourth openings may be the cross-sectional area in the horizontal direction (e.g. the x-axis direction and the y-axis direction). For example, the size of each of the third and fourth openings may mean the radius when the opening has a circular cross-section, and may mean the diagonal length when the opening has a square cross-section.

Each of the third and fourth openings may take the form of a hole having a circular cross-section, and the interface BO formed by the two liquids may be moved along the inclined surface of the cavity CA by a driving voltage.

The first liquid LQ1 and the second liquid LQ2 are charged, accommodated, or disposed in the cavity CA in the first plate 147. In addition, the cavity CA is the area through which the light that has passed through the first lens unit 110 or 110A passes. Thus, the first plate 147 may be formed of a transparent material, or may include impurities so that light does not easily pass therethrough.

The electrodes may be disposed respectively on one surface and the other surface of the first plate 147. A plurality of first electrodes E1 may be disposed on one surface (e.g. the upper surface, the side surface, and the lower surface) of the first plate 147 so as to be spaced apart from the second electrode E2. The second electrode E2 may be disposed on at least a portion of the other surface (e.g. the lower surface) of the first plate 147 and may be in direct contact with the first liquid LQ1.

In addition, the first electrodes E1 may be, "n" electrodes (hereinafter, referred to as 'individual electrodes'), and the second electrode E2 may be a single electrode (hereinafter, referred to as a 'common electrode'). Here, "n" may be a positive integer of 2 or greater.

Each of the first and second electrodes E1 and E2 may include at least one electrode sector. For example, the first electrode E1 may include two or more electrode sectors, and the second electrode E2 may include at least one electrode sector. For example, the plurality of first electrodes E1 may include a plurality of electrode sectors sequentially disposed in the clockwise direction (or in the counterclockwise direction) about the optical axis. Here, the electrode sector means a portion of the electrode.

A portion of the second electrode E2 (i.e. an electrode sector of the second electrode E2) disposed on the other surface of the first plate 147 may be exposed to the first liquid LQ1, which is conductive.

Each of the first and second electrodes E1 and E2 may be formed of a conductive material.

In addition, the second plate 145 may be disposed on one surface of the first electrodes E1. That is, the second plate 145 may be disposed above the first plate 147. Specifically, the second plate 145 may be disposed above the upper surface of the first electrodes E1 and the cavity CA.

The third plate 146 may be disposed on one surface of the second electrode E2. That is, the third plate 146 may be disposed below the first plate 147. Specifically, the third plate 146 may be disposed below the lower surface of the second electrode E2 and the cavity CA.

The second plate 145 and the third plate 146 may be disposed so as to face each other, with the first plate 147 interposed therebetween. In addition, at least one of the second plate 145 or the third plate 146 may be omitted.

At least one of the second or third plate 145 or 146 may have a rectangular planar shape. The third plate 146 may be brought into contact with and bonded to the first plate 147 on a bonding area thereof around the edge.

Each of the second and third plates 145 and 146 may be an area through which light passes, and may be formed of a light-transmitting material. For example, each of the second and third plates 145 and 146 may be formed of glass, and for convenience of processing, may be formed of the same material. In addition, the edge of each of the second and third plates 145 and 146 may have a rectangular shape, without being necessarily limited thereto.

The second plate 145 may be configured to allow the light introduced from the first lens unit 110 or 110A to travel into the cavity CA in the first plate 147.

The third plate 146 may be configured to allow the light that has passed through the cavity CA in the first plate 147 to travel to the second lens unit 130 or 130A. The third plate 146 may be in direct contact with the first liquid LQ1.

According to the embodiment, the third plate 146 may have a diameter greater than the diameter of a wider opening among the third and fourth openings in the first plate 147. In addition, the third plate 146 may include a peripheral area spaced apart from the first plate 147.

In addition, the actual effective lens area of the liquid lens 142 may be narrower than the diameter (e.g. $O_2$) of a wider opening among the third and fourth openings in the first plate 147.

The insulation layer 148 may be disposed so as to cover a portion of the lower surface of the second plate 145 in the upper area of the cavity CA. That is, the insulation layer 148 may be disposed between the second liquid LQ2 and the second plate 145.

In addition, the insulation layer 148 may be disposed so as to cover a portion of the first electrode E1, which forms the sidewall of the cavity CA. In addition, the insulation layer 148 may be disposed on the lower surface of the first plate 147 so as to cover the first electrode E1, the first plate 147, and a portion of the second electrode E2. Thus, contact between the first electrode E1 and the first liquid LQ1 and contact between the first electrode E1 and the second liquid LQ2 may be prevented by the insulation layer 148.

The insulation layer 148 may cover one electrode among the first and second electrodes E1 and E2 (e.g. the first electrode E1), and may expose a portion of the other electrode (e.g. the second electrode E2) so that electrical energy is applied to the first liquid LQ1, which is conductive.

In the case of the camera module 100 according to the embodiment, the filter 176 for the blocking of ultraviolet light or infrared light is disposed between the middle base 172 and the image sensor 182, and filters light within a specific wavelength range, among the light that has passed through the first lens unit 110, the liquid lens 142, and the second lens unit 130. In addition, such an infrared light blocking filter or an ultraviolet light blocking filter is mounted in an inner recess in the sensor base 178.

At least one substrate, for example, the first connection substrate 141 and the second connection substrate 144, serves to supply a voltage to the liquid lens 142. To this end, the plurality of first electrodes E1 may be electrically connected to the first connection substrate 141, and the second electrode E2 may be electrically connected to the second connection substrate 144.

When a driving voltage is applied to the first and second electrodes E1 and E2 through the first connection substrate 141 and the second connection substrate 144, the interface BO between the first liquid LQ1 and the second liquid LQ2 may be deformed, and thus at least one of the shape, such as a curvature, or the focal length of the liquid lens 142 may be changed (or adjusted). For example, the focal length of the liquid lens 142 may be adjusted as at least one of the flexure or the inclination of the interface BO formed in the liquid lens 142 is changed according to the driving voltage. When the deformation or the radius of curvature of the interface BO is controlled, the liquid lens 142, the lens assembly 110, 120, 130 and 140 including the liquid lens 142, the camera module 100, and the optical device may perform an auto-focusing (AF) function and a hand-tremor compensation or optical image stabilizer (OIS) function.

The first connection substrate 141 may transmit four different driving voltages (hereinafter, referred to as 'individual voltages') to the liquid lens 142, and the second connection substrate 144 may transmit one driving voltage (hereinafter, referred to as a 'common voltage') to the liquid lens 142. The common voltage may include a DC voltage or an AC voltage. When the common voltage is applied in a pulse form, the pulse width or the duty cycle may be constant. The individual voltages supplied via the first connection substrate 141 may be applied to the plurality of first electrodes E1 (or the plurality of electrode sectors) exposed at the respective corners of the liquid lens 142.

Although not illustrated, when conductive epoxy is disposed between the first connection substrate 141 and the plurality of first electrodes E1, the first connection substrate 141 and the plurality of first electrodes E1 may be in contact with each other, may be coupled to each other, and may be in electrical conduction with each other. In addition, when conductive epoxy is disposed between the second connection substrate 144 and the second electrode E2, the second connection substrate 144 and the second electrode E2 may be in contact with each other, may be coupled to each other, and may be in electrical conduction with each other.

In addition, the first connection substrate 141 and the plurality of first electrodes E1 may be implemented as separate elements, or may be integrally formed. In addition, the second connection substrate 144 and the second electrode E2 may be implemented as separate elements, or may be integrally formed.

FIG. 6 is a schematic block diagram of the camera module 200.

Referring to FIG. 6, the camera module 200 may include a control circuit 210 and a lens assembly 250. The control circuit 210 may correspond to the control circuit 24 shown in FIG. 1, and the lens assembly 250 may correspond to the lens assembly 22 shown in FIG. 1 or the lens assembly 110, 120, 130 and 140 shown in FIG. 2.

The control circuit 210 may include a control unit 220, and may control the operation of the liquid lens unit 140 including a liquid lens 280.

The control unit 220 may have a configuration for performing an AF function and an OIS function, and may control the liquid lens 280 included in the lens assembly 250 using a user request or a sensed result (e.g. a motion signal of a gyro sensor 225). Here, the liquid lens 280 may correspond to the above-described liquid lens 142.

The control unit 220 may include a gyro sensor 225, a controller 230, and a voltage driver 235. In addition, the control unit 220 may include a temperature feedback provider 226 as shown in FIG. 6, or the temperature feedback provider 226 may be omitted unlike FIG. 6. The gyro sensor 225 may be an independent component that is not included in the control unit 220, or may be included in the control unit 220.

The gyro sensor 225 may sense the angular velocity of movement in two directions, including a yaw-axis direction and a pitch-axis direction, in order to compensate for hand tremor in the vertical and horizontal directions of the optical device. The gyro sensor 225 may generate a motion signal corresponding to the sensed angular velocity, and may provide the motion signal to the controller 230.

The controller 230 may remove a high frequency noise component from the motion signal using a low pass filter (LPF) so as to extract only a desired frequency band for implementation of an OIS function, may calculate the amount of hand tremor using the motion signal from which the noise has been removed, and may calculate a driving voltage corresponding to the shape that the liquid lens 280 of the liquid lens module 260 needs to have in order to compensate for the calculated amount of hand tremor.

The controller 230 may receive information for an AF function (i.e. information on the distance to an object) from an internal component (e.g. an image sensor 182) or an external component (e.g. a distance sensor or an application processor) of the optical device or the camera module 200, and may calculate a driving voltage corresponding to the desired shape of the liquid lens 280 based on a focal length, which is required to focus on the object, using the distance information.

The controller 230 may store a driving voltage table in which a driving voltage and a driving voltage code for making the voltage driver 235 generate the driving voltage are mapped, may acquire a driving voltage code corresponding to the calculated driving voltage by referring to the driving voltage table, and may output the acquired driving voltage code to the voltage driver 235.

The voltage driver 235 may generate, based on a driving voltage code in a digital form provided from the controller 230, a driving voltage in an analog form corresponding to the driving voltage code, and may provide the driving voltage to the lens assembly 250.

The voltage driver 235 may include a voltage booster, which increases a voltage level upon receiving a supply voltage (e.g. a voltage supplied from a separate power supply circuit), a voltage stabilizer for stabilizing the output of the voltage booster, and a switching unit for selectively supplying the output of the voltage booster to each terminal of the liquid lens 280.

Here, the switching unit may include a circuit component called an H bridge. A high voltage output from the voltage booster is applied as a power supply voltage of the switching unit. The switching unit may selectively supply the applied power supply voltage and a ground voltage to opposite ends of the liquid lens 280. Here, as described above, the liquid lens 280 may include the four first electrodes E1 including four electrode sectors, the first connection substrate 141, the second electrode E2, and the second connection substrate 144 for driving. Opposite ends of the liquid lens 280 may mean any one of the plurality of first electrodes E1 and the second electrode E2. In addition, opposite ends of the liquid lens 280 may mean any one of the four electrode sectors of the four first electrodes E1 and one electrode sector of the second electrode E2.

A pulse-type voltage having a predetermined width may be applied to each electrode sector of the liquid lens 280, and the driving voltage applied to the liquid lens 280 is the difference between the voltages applied to each of the first electrodes E1 and the second electrode E2.

In addition, in order to allow the voltage driver 235 to control the driving voltage applied to the liquid lens 280 depending on a driving voltage code in a digital form provided from the controller 230, the voltage booster may control an increase in a voltage level, and the switching unit may control the phase of a pulse voltage applied to the common electrode and the individual electrodes so as to generate a driving voltage in an analog form, which corresponds to the driving voltage code.

That is, the control unit 220 may control the voltage applied to each of the first electrodes E1 and the second electrode E2.

The control circuit 210 may further include a connector (not shown), which performs a communication or interface function of the control circuit 210. For example, the connector may perform communication protocol conversion for communication between the control circuit 210, which uses an inter-integrated circuit (I2C) communication method, and the lens assembly 250, which uses a mobile industry processor interface (MIPI) communication method. In addition, the connector may receive power from an external source (e.g. a battery), and may supply power required for the operation of the control unit 220 and the lens assembly 250. In this case, the connector may correspond to the connector 153 shown in FIG. 2.

The lens assembly 250 may include the liquid lens module 260, and the liquid lens module 260 may include a driving voltage provider 270 and the liquid lens 280.

The driving voltage provider 270 may receive a driving voltage from the voltage driver 235, and may provide the driving voltage to the liquid lens 280. Here, the driving voltage may be an analog voltage applied between any one of the "n" individual electrodes and one common electrode.

The driving voltage provider 270 may include a voltage adjustment circuit (not shown) or a noise removal circuit (not shown) for compensating for loss due to terminal connection between the control circuit 210 and the lens assembly 250, or may divert the voltage provided from the voltage driver 235 to the liquid lens 280.

The driving voltage provider 270 may be disposed on an FPCB (or a substrate), which constitutes at least a portion of the connection part 152, but the embodiment is not limited thereto. The connection part 152 may include the driving voltage provider 270.

The liquid lens 280 may be deformed in the interface BO thereof between the first liquid LQ1 and the second liquid LQ2 depending on a driving voltage, thereby performing at least one of an AF function or an OIS function.

FIGS. 7(a) and (b) are views for explaining the liquid lens 142, the interface of which is adjusted in response to a driving voltage. Specifically, FIG. 7(a) illustrates a perspective view of the liquid lens 142 according to the embodiment, and FIG. 7(b) illustrates an equivalent circuit of the liquid lens 142. Here, the liquid lens 142 is the same as the liquid lens 142 of FIG. 2, and thus is designated by the same reference numeral.

First, referring to FIG. 7(a), the liquid lens 142, the interface BO of which is adjusted in shape in response to a driving voltage, may receive the driving voltage via a plurality of electrode sectors E11, E12, E13 and E14 of the plurality of first electrodes E1, which are disposed in four different directions to have the same angular distance therebetween, and an electrode sector C0 of the second electrode E2. When the driving voltage is applied via any one of the plurality of electrode sectors E11, E12, E13 and E14 of the plurality of first electrodes E1 and the electrode sector C0 of the second electrode E2, the shape of the interface BO between the first liquid LQ1 and the second liquid LQ2, which are disposed in the cavity CA, may be deformed. The degree of deformation and the shape of the interface BO between the first liquid LQ1 and the second liquid LQ2 may be controlled by the controller 230 in order to implement at least one of an AF function or an OIS function.

In addition, referring to FIG. 7(b), the liquid lens 142 may be explained as a plurality of capacitors 343, in which one side of the liquid lens 142 receives a voltage from the different electrode sectors E11, E12, E13 and E14 of the first electrodes E1, and the other side of the liquid lens 142 is connected to the electrode sector C0 of the second electrode E2 so as to receive a voltage therefrom.

In FIG. 7(a), the number of different electrode sectors E11, E12, E13 and E14 included in the plurality of first electrodes E1 is illustrated as being four, but the embodiment is not limited thereto.

Here, the two electrodes E1 and E2 are divided into a second electrode E2, which is exposed to the conductive liquid LQ1, and a first electrode E1, which is not exposed to the conductive liquid LQ1. Referring to FIGS. 3(a), 4, and 5 the second electrode E2, which is exposed to the conductive liquid LQ1, may be connected to the common terminal C0, and the first electrode E1, which is not exposed to the conductive liquid LQ1, may be connected to different individual terminals L1, L2, L3 and L4. The first electrode E1, which is connected to the different individual terminals L1, L2, L3 and L4, may be divided into multiple segments, which are electrically and physically separated from each other.

Meanwhile, according to an embodiment, the area of the second electrode E2 and the area of the first electrode E1 may be substantially the same. Here, the area of the first electrode E1 may be equal to the sum of the areas of the multiple segments. Further, all of the multiple segments included in the first electrode E1 may have substantially the same area as each other.

The electrical characteristics of the liquid lens 140A described with reference to FIGS. 7(a) and 5 may be explained as those of multiple unit capacitors, which are divided and connected in parallel on the basis of multiple segments included in the first electrode E1, as described with reference to FIG. 7(b). Further, the electrical characteristics of the liquid lens 140A may be explained as those of a single capacitor on the basis of the second electrode E2 and the first electrode E1 thereof. In the case in which the area of the second electrode E2 and the area of the first electrode E1 are substantially the same, when the liquid lens 140A is regarded as one capacitor, this may mean that the areas of the two electrodes of the capacitor are substantially the same. Further, when all of the multiple segments included in the first electrode E1 have substantially the same area, this may mean that the capacitances of the unit capacitors, which are connected in parallel, are substantially the same in the same environment or conditions. In this case, the electrical characteristics of the liquid lens 140A, which may be described as those of a capacitor, may be more clearly specified, thereby enabling more precise and accurate control of the liquid lens 140A and reduced control error. This results in improved operational safety and performance of the liquid lens 140A.

FIG. 8 illustrates variation in the interface in the liquid lens. Specifically, (a) to (c) illustrate movement of the interfaces 30a, 30b and 30c, which may occur when a voltage is applied to the individual electrodes L1, L2, L3 and L4 of the liquid lens 28. The liquid lens 28 may correspond to the liquid lens 140A described with reference to FIG. 5, and the interfaces 30a, 30b and 30c may correspond to the interface BO formed between the two liquids LQ1 and LQ2 described with reference to FIG. 5.

First, referring to (a), when substantially the same voltage is applied to the individual electrodes L1, L2, L3 and L4 of the liquid lens 28, the interface 30a may maintain a shape that is close to a circle. When viewed from the top side, the horizontal length LH of the interface and the vertical length LV of the interface may be substantially the same, and the movement (e.g. inclination angle) of the interface 30a may be balanced. In this case, the capacitance values of the interface 30a measured through the four different individual electrodes L1, L2, L3 and L4 may be substantially the same.

In addition, referring to (b), the case in which the voltage applied to the first individual electrode L1 and the third individual electrode L3 of the liquid lens 28 is higher than the voltage applied to the second individual electrode L2 and the fourth individual electrode L4 will be described. In this case, since force of pulling or pushing the interface 30b differs between the horizontal direction and the vertical direction, when viewed from the top side, the horizontal length LH of the interface may be shorter than the vertical length LV of the interface. Since the inclination angle of the interface 30b of the liquid lens 28 at the second individual electrode L2 and the fourth individual electrode L4 is smaller than the inclination angle of the interface 30b of the liquid lens 28 at the first individual electrode L1 and the third individual electrode L3 when the voltage applied to the second individual electrode L2 and the fourth individual electrode L4 is lower than the voltage applied to the first individual electrode L1 and the third individual electrode L3, the vertical length LV is longer than the horizontal length LH when considered in three dimensions, although they seem to be the same in a plan view. In this case, the capacitance values of the interface 30b measured using the four different individual electrodes L1, L2, L3 and L4 may be different. Meanwhile, since the interface 30b is symmetrically changed in shape, the capacitance values of the interface 30b measured using the four different individual electrodes L1, L2, L3 and L4 may be symmetrical. In this case, the capacitance values from L1 and L3 may be the same, and the capacitance values from L2 and L4 may be the same.

In addition, referring to (c), in the case in which the voltage applied to the first individual electrode L1 and the third individual electrode L3 of the liquid lens 28 is different from the voltage applied to the second individual electrode L2 and the fourth individual electrode L4, when viewed from the top side, the vertical length LV of the interface may be shorter than the horizontal length LH of the interface. In the same manner as the case in (b), the capacitance values of the interface 30c measured using the four different individual electrodes L1, L2, L3 and L4 may be different. Meanwhile, since the interface 30c is symmetrically changed in shape, the capacitance values of the interface 30c measured using the four different individual electrodes L1, L2, L3 and L4 may be symmetrical. In this case, the capacitance values from L1 and L3 may be the same, and the capacitance values from L2 and L4 may be the same.

In addition, the capacitance values measured in the interfaces 30a, 30b and 30c illustrated in (a), (b) and (c) may be different, and through the difference in capacitance, movement of the interfaces 30a, 30b and 30c depending on the voltage applied to the first individual electrode L1 to the fourth individual electrode L4 may be more directly and accurately measured.

Meanwhile, although the above-described example describes the structure in which the liquid lens 28 includes four individual electrodes, when the liquid lens 28 includes a greater number of individual electrodes such as eight, twelve, or sixteen individual electrodes and further includes feedback electrodes corresponding thereto, the movement of the liquid lens 28 may be more precisely controlled, and the corresponding movement may be measured more accurately.

FIG. 9 illustrates a control circuit, which is interlocked with the liquid lens.

As shown, the liquid lens 28 includes four individual electrodes L1, L2, L3 and L4 and a single common electrode C0 (refer to FIG. 7). A voltage control circuit 40 may generate and supply voltages $V_{L1}$, $V_{L1}$, $V_{L3}$, $V_{L4}$ and $V_{C0}$ to be applied to the four individual electrodes L1, L2, L3 and L4 and the single common electrode C0. For example, referring to FIG. 5, the four individual electrodes L1, L2, L3 and L4 may correspond to the first electrodes E1, and the single common electrode C0 may correspond to the second electrode E2.

A capacitance measurement circuit 50 serves to measure or calculate the position, shape, or movement of the interface 30 in the liquid lens 28. The position, shape, or movement of the interface 30 in the liquid lens 28 may be measured using capacitance, as described with reference to FIG. 7. In order to measure the capacitance between the first electrode and the second electrode of the liquid lens 28, at least one individual electrode L1, L2, L3 or L4 and the common electrode included in the liquid lens 28 may be used.

The voltage control circuit 40 may provide the voltages $V_{L1}$, $V_{L2}$, $V_{L3}$, $V_{L4}$ and $V_{C0}$ within a range from at least 0V to 80V to the four individual electrodes L1, L2, L3 and L4 and the common electrode C0 at the same time or at different times. The voltage control circuit 40 may not apply the voltages to the four individual electrodes L1, L2, L3 and L4 and the common electrode C0 at the same time, but may transfer the voltages according to a timing that is generated in the voltage control circuit 40 or by a separate control unit (not shown).

As shown, the interface 30 in the liquid lens 28 may be controlled in response to a driving voltage, which is created by the voltages $V_{L1}$, $V_{L2}$, $V_{L3}$, $V_{L4}$ and $V_{C0}$ transferred to the four individual electrodes L1, L2, L3 and L4 and the common electrode C0. Variation in the movement, position, or shape of the interface 30 in the liquid lens 28 may be caused by the voltage difference between the first to fourth voltages $V_{L1}$, $V_{L2}$, $V_{L3}$ and $V_{L4}$ and the voltage $V_{C0}$ applied to the common electrode C0.

When variation in the movement, position, or shape of the interface 30 in the liquid lens 28 is caused by the voltage difference between the first to fourth voltages $V_{L1}$, $V_{L2}$, $V_{L3}$ and $V_{L4}$ and the voltage $V_{C0}$ of the common electrode C0, variation in capacitance may occur. Such variation in capacitance, caused by variation in the movement, position, or shape of the interface 30 in the liquid lens 28, may be within a small range, for example, within a few pF to scores of pF.

The position or shape of the interface 30 depending on the voltage applied to the first to fourth individual electrodes L1, L2, L3 and L4 may be measured by applying a ground voltage GND (0V) to the common electrode C0, and then floating the common electrode C0. More specifically, when the common electrode C0 floats and a falling-edge timing, in which one of the first to fourth voltages $V_{L1}$, $V_{L2}$, $V_{L3}$ and $V_{L4}$ applied to the first to fourth individual electrodes L1, L2, L3 and L4 falls from a high voltage (e.g. 10 to 80V) to the ground voltage (0V), or a rising-edge timing occurs, capacitance may be measured using variation in the voltage applied to the corresponding electrode (ground floating edge measurement).

The capacitance measurement circuit 50, which is connected to the common electrode C0 in the liquid lens 28, may measure the capacitance between the individual electrodes and the common electrode in the liquid lens 28. In some embodiments, the capacitance measurement circuit 50 may include various components.

In one example, the capacitance measurement circuit 50, which serves to measure variation in small capacitance within a range from a few pF to scores of pF, may not measure any absolute value of capacitance, but may instead measure variation in capacitance via a differential comparison of measuring the capacitance from the magnitude of difference in physical variation that occurs when one or both of two capacitors, the capacitance values of which are already known, are exposed to the external variation.

In another example, the capacitance measurement circuit 50, which serves to measure small capacitance within a range from a few pF to scores of pF, may measure the capacitance of the interface 30 by calculating the ratio of a capacitor having an already known large value to a capacitor having a small value to be measured and acquiring the values from the calculated ratio.

The capacitance measurement circuit 50 may transfer the calculated or measured information to the voltage control circuit 40, and the voltage control circuit 40 may adjust the voltages $V_{L1}$, $V_{L2}$, $V_{L3}$, $V_{L1}$ and $V_{C0}$ based on the information. The information calculated or measured in the capacitance measurement circuit may be a voltage or capacitance value. A liquid lens control circuit may be configured such that the capacitance measurement circuit transfers the calculated information to the voltage control circuit 40 and the voltage control circuit 40 adjusts the driving voltage using the calculated information.

FIG. 10 illustrates an example of the capacitance measurement circuit. The capacitance measurement circuit illustrated in FIG. 10 is proposed by way of example, and may include various components in some embodiments.

As shown, when a $V_{L1}$ is applied to one L1 of individual electrodes disposed in the liquid lens, the capacitance measurement circuit 54 connected to another electrode C0 measures the capacitance between the two electrodes L1 and C0, thereby enabling the recognition of the state of the interface 30.

When the voltage $V_{L1}$ is applied and a first switch SW1 is connected, the magnitude Q of charge in the interface 30 may be equal to a value obtained by multiplying variation in voltage $\Delta V_{L1}$ by the capacitance C of the interface 30. When the first switch SW1 is connected, the charge may move to a reference capacitor Cap-m.

Thereafter, when the first switch SW1 is turned off and a second switch SW2 is turned on in a falling-edge state in which the voltage $V_{L1}$ falls to a ground voltage, the charge Q, which has moved to the reference capacitor Cap-m, may move to an on-chip capacitor Cap-on. At this time, the magnitude Q of charge moved to the on-chip capacitor Cap-on may be equal to a value obtained by multiplying variation in feedback voltage $\Delta V_{L1}$ by the capacitance of the on-chip capacitor Cap-on.

By adjusting the ratio of the number of couplings by the capacitance C of the interface 30 to the number of couplings by the on-chip capacitor Cap-on so that the total magnitude of charge accumulated in the reference capacitor Cap-m becomes zero, the ratio of the two capacitances is calculated from the adjusted ratio. Since the capacitance of the on-chip capacitor Cap-on is a known value, the capacitance C of the interface 30 may be measured.

The configuration of the capacitance measurement circuit 54 described above may be changed in some embodiments, and an operation and a control method depending on the configuration may be changed. Here, the capacitance measurement circuit 54 may be designed so as to measure variation in capacitance within a range from a few pF to 200 pF.

The configuration of a circuit that measures capacitance may be implemented in various ways in some embodiments. For example, there may be used a circuit, coupled with a common electrode, which calculates capacitance based on a resonance frequency using LC series resonance. However, when the LC series resonance is used, since it is necessary to apply waveforms for respective frequencies in order to find the resonance frequency, time may be consumed to calculate the capacitance, which may have an effect on the interface in the liquid lens. However, the capacitance measurement circuit 54 described above is a capacitance measurement circuit using a switched capacitor. The switched capacitor may include two switches and one capacitor, and may serve to control the average current that flows through the two switches. The average resistance may be inversely proportional to the capacity of the capacitor and a switch operating frequency. When the capacitance of the liquid lens is measured using the switched capacitor, the capacitance may be measured at a very high speed (e.g. scores of ns).

In addition, as a circuit for measuring capacitance, as compared with an LC series resonance circuit including all of a resistor, an inductor and a capacitor, the switched capacitor circuit, which may include the capacitor and the switches only, may be more integrated, so as to be easily applicable to a mobile appliance, or the like. One end of the first switch may be electrically connected to the liquid lens and the voltage control circuit.

FIG. 11 illustrates a first example of the control circuit. For convenience of description, one L1 of the individual electrodes will be described by way of example.

As shown, the control circuit may include the voltage control circuit 40 and the capacitance measurement circuit 50, and may be connected to the liquid lens 28. The voltage control circuit 40 may selectively transfer one of a high voltage (e.g. 70V or 35V) and a ground voltage GND to the individual electrode L1 and the common electrode C0 included in the liquid lens 28.

The capacitance measurement circuit 50 may be connected to the common electrode C0. When the first switch SW1, which will be described later, is connected to the capacitance measurement circuit 50 in order to measure the capacitance of the liquid lens 28, the charge stored in the capacitor of the liquid lens 28 may be transferred to the capacitance measurement circuit 50. The capacitance measurement circuit 50 may further include components such as a capacitor and a comparator, and may measure the magnitude of charge transferred from the capacitor of the liquid lens 28.

The first switch SW1 may be disposed between the capacitance measurement circuit 50 and the liquid lens 28.

A ground voltage GND is applied to the common electrode C0, prior to measuring the capacitance of the liquid lens 28. Then, when the first switch SW1 is connected (turned on), a second switch SW0 of the voltage control circuit 40 is turned off to float the common electrode C0. The second switch SW0 serves to apply the ground voltage GND to the common electrode C0. Thereafter, when the first switch SW1 is connected and the voltage $V_{L1}$ applied to the individual electrode L1 to be measured is changed, the charges stored in the capacitor of the liquid lens 28 (e.g. Q (magnitude of charge)=$\Delta V_{L1} \times$C (capacitance of liquid lens)) may move to the capacitance measurement circuit 50.

FIG. 12 illustrates the operation of the control circuit in FIG. 11.

As shown, a high voltage (e.g. 70V or 35V) and a ground voltage (e.g. 0V) may be applied to the individual electrodes L1, L2, L3 and L4 and the common electrode C0 of the liquid lens at a timing that is controlled in a time-division control manner.

After the time at which a ground voltage is applied to the common electrode C0, i.e. the time at which the second switch SW0 of the voltage control circuit 40 is connected, the second switch SW0 is turned off to float the common electrode C0 and the first switch SW1 connected to the capacitance measurement circuit 50 is connected (turned on). In this state, the capacitance may be measured at the time of falling-edge in which the voltage applied to the individual electrodes L1, L2, L3 and L4 falls from a high voltage to the ground voltage.

The falling edge of the voltage $V_{L3}$ applied to the third individual electrode L3 may occur at the time at which the first switch SW1 is connected at first, and thus a third capacitance $C_{L3}$ between the third individual electrode L3 and the common electrode C0 may be measured. Thereafter, at the time at which the first switch SW1 is connected, a fourth capacitance $C_{L4}$ between the fourth individual electrode L4 and the common electrode C0, a second capacitance $C_{L2}$ between the second individual electrode L2 and the common electrode C0, and a first capacitance $C_{L1}$ between the first individual electrode L1 and the common electrode C0 may be sequentially measured. No voltage would be supplied to the common electrode C0 from the voltage control circuit during the section for which the first switch SW1 is turned on.

Meanwhile, for the measurement of the capacitance, the voltage control circuit 40 may rotate the voltage applied to the respective individual electrodes included in the liquid lens 28 in a clockwise direction or in a counterclockwise direction so that the voltage is transferred to the respective individual electrodes at different times.

FIG. 13 illustrates a second example of the control circuit. For convenience of description, one L1 of the individual electrodes will be described by way of example.

As shown, the control circuit may include the voltage control circuit 40 and the capacitance measurement circuit 50, and may be connected to the liquid lens 28. The voltage control circuit 40 may selectively transfer one of a high voltage (e.g. 70V or 35V) and a ground voltage GND to the individual electrode L1 and the common electrode C0 included in the liquid lens 28.

The capacitance measurement circuit 50 may be connected to the common electrode C0. When the first switch SW1, which will be described later, is connected to the capacitance measurement circuit 50 in order to measure the capacitance in the liquid lens 28, the charge stored in the capacitor of the liquid lens 28 may be transferred to the capacitance measurement circuit 50. The capacitance measurement circuit 50 may further include other components such as a capacitor and a comparator, and may measure the magnitude of charge transferred from the capacitor of the liquid lens 28.

The first switch SW1 may be disposed between the capacitance measurement circuit 50 and the liquid lens 28.

The control circuit may further include a third switch SW3 disposed between the voltage control circuit 40 and the first switch SW1 and/or between the voltage control circuit 40 and the liquid lens 28. The third switch SW3 may be connected at one end thereof to the voltage control circuit 40 and at the other end thereof to the liquid lens 28 and the first switch SW1. The third switch SW3 may control the floating state in a process in which the capacitance measurement circuit 50 connected to the common electrode C0 measures capacitance. In addition, as compared with the control of the floating state using the switch inside the voltage control circuit 40, the independently connected switch SW3 may more effectively reduce the internal pressure of a switching element.

The third switch SW3 is connected to apply the ground voltage GND to the common electrode C0, prior to measuring the capacitance of the liquid lens 28. Thereafter, the third switch SW3 floats the common electrode C0. By changing the voltage $V_{L1}$ applied to the individual electrode L1 to be measured when the first switch SW1 is connected (turned on), the charges stored in the capacitor of the liquid lens 28 (e.g. Q (magnitude of charge)=$\Delta V_{L1} \times C$ (capacitance of liquid lens)) may move to the capacitance measurement circuit 50.

FIG. 14 illustrates the operation of the control circuit in FIG. 13.

As shown, a high voltage (e.g. 70V or 35V) and a ground voltage (e.g. 0V) may be applied to the individual electrodes L1, L2, L3 and L4 and the common electrode C0 of the liquid lens at a timing that is controlled in a time-division control manner.

The third switch SW3 may be connected to the voltage control circuit 40 to apply a ground voltage to the common electrode C0, for measuring the capacitance. After the ground voltage GND is applied to the common electrode C0 in the connected state of the third switch SW3, the third switch SW3 is turned off to float the common electrode C0. In the floated state of the common electrode C0, the first switch SW1 in the capacitance measurement circuit 50 is connected (turned on). In this state, the charge may move at the time of falling-edge in which the voltage applied to the individual electrodes L1, L2, L3 and L4 falls from a high voltage to the ground voltage.

The falling edge of the voltage $V_{L3}$ applied to the third individual electrode L3 may occur at the time at which the first switch SW1 is connected at first, and thus a third capacitance $C_{L3}$ between the third individual electrode L3 and the common electrode C0 may be measured. Thereafter, at the time at which the second switch SW1 is connected, a fourth capacitance $C_{L1}$ between the fourth individual electrode L4 and the common electrode C0, a second capacitance $C_{L2}$ between the second individual electrode L2 and the common electrode C0, and a first capacitance $C_u$ between the first individual electrode L1 and the common electrode C0 may be sequentially measured.

In some embodiments, the liquid lens may include a greater number of individual electrodes than eight individual electrodes. However, the number of individual electrodes may be a multiple of 4. In addition, the number of feedback electrodes disposed in the liquid lens may be the same as or different from the number of individual electrodes included in the liquid lens.

FIG. 15 illustrates the connection between the liquid lens and the control circuit. In particular, FIG. 15 illustrates the connection to the control circuit described with reference to FIG. 9 in more detail.

As shown, the liquid lens 28 may be connected to the voltage control circuit 40, which supplies voltages to the individual electrodes and the common electrode of the liquid lens 28, and the capacitance measurement circuit 50 may be connected to one of the two electrodes of the liquid lens 28. The two electrodes, which are located at positions at which the capacitance in the liquid lens 28 is to be measured, i.e. located at opposite sides of the capacitance measurement location, may be selected as described above with reference to FIGS. 8 to 11.

Meanwhile, the voltage control circuit 40 and the capacitance measurement circuit 50 are connected to each other via a switching element SW_V. The switching element SW_V is turned on at the time at which the capacitance in the liquid lens 28 is to be measured so that an input voltage VIN before boosting in the voltage control circuit 40 may be transferred to the capacitance measurement circuit 50.

FIG. 16 illustrates the timing of switching elements illustrated in FIG. 15 in order to measure the capacitance of the liquid lens. A detailed operation of the capacitance measurement circuit 50 has already been described above with reference to FIG. 9. Hereinafter, the following description will focus on the operating time of the switching circuit described above with reference to FIG. 12.

As shown, in order to apply the voltage VIN required to measure the capacitance of the liquid lens, the switching element SW_V is turned on. In addition, a fourth switch SW13 is turned on to apply a ground voltage to the reference capacitor Cap-m in the capacitance measurement circuit 50 so as to discharge the charge.

Thereafter, when a fifth switch SW11 is connected, the charge accumulated due to the capacitance of the liquid lens moves to the reference capacitor Cap-m. After the fifth switch SW11 is turned off, a first capacitance value in the reference capacitor Cap-m may be sensed (first cap sensing window).

Thereafter, the switching element SW_V is turned on to apply the voltage VIN, and a sixth switch SW12 is turned on. At this time, the charge accumulated in the reference capacitor Cap-m may move. Thereafter, in the state in which the switching element SW_V and the second switch SW12 are turned off, a second capacitance value in the reference capacitor Cap-m may be sensed (second cap sensing window).

Thereafter, a method of recognizing the capacitance of the liquid lens may be identical to the description made with reference to FIG. 12.

The capacitance in the liquid lens, which is calculated or measured by the capacitance measurement circuit, may be transferred to the voltage control circuit. The voltage control circuit, which receives the capacitance of the liquid lens, may recognize the shape or state of the interface in the liquid lens based on the capacitance. When the shape or state of the interface in the liquid lens differs from a target shape or state, the voltage control circuit may adjust the driving voltage.

As described above, a method of controlling the liquid lens may include a step of accumulating a charge between the common electrode and the individual electrode by connecting the common electrode of the liquid lens to a ground and applying a voltage to the individual electrode of the liquid lens, a step of turning on the first switch disposed between the capacitance measurement circuit and the liquid lens, and a step of measuring a voltage at opposite ends of the reference capacitor of the capacitance measurement circuit. Thereafter, the capacitance between the common electrode and the individual electrode may be calculated using the measured voltage value at opposite ends of the reference capacitor.

In some embodiments, a method of controlling the liquid lens may include a step of connecting one of the common electrode and the individual electrode of the liquid lens to a ground, a step of applying a voltage to the other one of the common electrode and the individual electrode of the liquid lens, a step of accumulating a charge between the common electrode and the individual electrode, a step of turning on the first switch, a step of measuring a voltage at opposite ends of the reference capacitor of the capacitance measurement circuit, and a step of calculating the capacitance between the common electrode and the individual electrode using the measured voltage value at opposite ends of the reference capacitor.

FIG. 17 illustrates a feedback circuit, which is interlocked with the liquid lens. The liquid lens may include a common electrode, a first feedback electrode, a plurality of individual electrodes, and a second feedback electrode. The capacitance measurement circuit may calculate the capacitance between the first feedback electrode and the second feedback electrode. The second feedback electrode may be disposed between the individual electrodes, and the first feedback electrode may be disposed at a position corresponding to the second feedback electrode. The first feedback electrode may be disposed close to a first electrode, and the second feedback electrode may be disposed between a plurality of second electrodes. A connection unit may include a first substrate and a second substrate, the first substrate may transfer a voltage to the first feedback electrode, and the second substrate may transfer a voltage to the second electrode or may transfer a feedback voltage to the second feedback electrode. The first electrode may be the common electrode, and the second electrodes may be the individual electrodes. The number of second feedback electrodes may be the same as the number of second electrodes.

An insulation film may be provided on the cavity in the liquid lens so as to cover the second electrodes and the second feedback electrodes. The capacitance measurement circuit may calculate the capacitance between two first feedback electrodes among a plurality of first feedback electrodes of the liquid lens. The first feedback electrodes may be disposed between the individual electrodes. The first feedback electrodes may be disposed close to the common electrode.

As shown, the liquid lens 28 includes four individual electrodes L1, L2, L3 and L4 and one common electrode C0 (not shown). The voltage control circuit 40 may generate and supply driving voltages $V_{L1}$, $V_{L2}$, $V_{L3}$, $V_{L1}$ and $V_{C0}$ to be applied to the four individual electrodes L1, L2, L3 and L4 and the single common electrode C0. For example, referring to FIGS. 5 and 17, the four individual electrodes L1, L2, L3 and L4 may correspond to the first electrodes E1, and the single common electrode C0 may correspond to the second electrode E2.

A feedback circuit 70 serves to measure the movement of the interface 30 in the liquid lens 28. The capacitance of the interface 30 in the liquid lens 28 may be understood and measured as described above with reference to FIG. 7. In order to measure variation in the capacitance of the interface 30 in the liquid lens 28, at least one feedback electrode F1, F2, F3 or F4 included in the liquid lens 28 may be used.

The feedback circuit 70 may include the feedback voltage control circuit 52 and the capacitance measurement circuit 54. The feedback voltage control circuit 52 may transfer a feedback voltage to any one feedback electrode among the first feedback electrode and the second feedback electrode in order to measure the capacitance between the first feedback electrode and the second feedback electrode. The feedback voltage control circuit 52 outputs a feedback voltage $V_F$ for the measurement of the capacitance to at least one feedback electrode F1, F2, F3 or F4. Since the voltages $V_{L1}$, $V_{L2}$, $V_{L3}$, $V_{L1}$ and $V_{C0}$ output to the voltage control circuit 40 are high voltages within a range from at least 10V to 80V, they may not be suitable for measuring the capacitance of the interface 30 within a very small range (from about scores of pF to 200 pF). Therefore, the feedback voltage control circuit 52 may supply the feedback voltage $V_F$, which may be within a low-level range (from about 1.5V to 5V), to at least one feedback electrode F1, F2, F3 or F4. The feedback voltage may range from 1.5 to 5V, and the voltage supplied to the liquid lens may range from 10 to 80V.

The feedback circuit 70 may transfer a feedback voltage to any one feedback electrode among two different feedback electrodes in order to measure the capacitance between the two different feedback electrodes. The two different feedback electrodes may be included in the liquid lens. The liquid lens may include the first plate having the cavity in which the conductive liquid and the non-conductive liquid are accommodated, the common electrode and the first feedback electrode disposed on the first plate, and the plurality of individual electrodes and the second feedback electrode disposed under the first plate.

When the feedback voltage $V_F$ is applied to one side of the liquid lens 28, the capacitance measurement circuit 54 connected to the other side may measure the capacitance between one side and the other side of the liquid lens 28. In some embodiments, the capacitance measurement circuit 54 may include various components. Variation in capacitance, which is caused by movement and variation of the interface 30 in the liquid lens 28, may be within a small range from a few pF to scores of pF.

In one example, the capacitance measurement circuit 54, which serves to measure variation in small capacitance within a range from a few pF to scores of pF, may not measure any absolute value of capacitance, but may instead measure variation in capacitance via a differential comparison of measuring the capacitance from the magnitude of difference in physical variation that occurs when one or both of two capacitors, the capacitance values of which are already known, are exposed to the external variation.

In another example, the capacitance measurement circuit 54, which serves to measure small capacitance within a range from a few pF to scores of pF, may measure the capacitance of the interface 30 by calculating the ratio of a capacitor having an already known large value to a capacitor having a small value to be measured and acquiring the values from the calculated ratio.

The feedback circuit 70 may transfer the calculated or measured information to the voltage control circuit 40, and the voltage control circuit 40 may adjust the voltage based on the information. The information calculated or measured in the feedback circuit may be a voltage or capacitance value.

The capacitance measurement circuit may transfer the calculated information to the voltage control circuit, and the voltage control circuit may adjust the driving voltage based on the calculated information. Here, the calculated information may be a voltage or capacitance value.

FIG. 18 illustrates variation in the interface in the liquid lens. Specifically, (a) to (c) illustrate movement of the interfaces 30a, 30b and 30c, which may occur when a driving voltage is applied to the individual electrodes L1, L2, L3 and L4 of the liquid lens 28.

First, referring to (a), when substantially the same voltage is applied to the individual electrodes L1, L2, L3 and L4 of the liquid lens 28, the interface 30a may maintain a shape that is close to a circle. When viewed from the top side, the horizontal length LH of the interface and the vertical length LV of the interface may be substantially the same, and the movement (e.g. inclination angle) of the interface 30a may be balanced. In this case, the capacitance values of the interface 30a measured through the four different individual electrodes L1, L2, L3 and L4 may be substantially the same.

In addition, referring to (b), the case in which the voltage applied to the first individual electrode L1 and the third individual electrode L3 of the liquid lens 28 is higher than the voltage applied to the second individual electrode L2 and the fourth individual electrode L4 will be described. In this case, since force of pulling or pushing the interface 30b differs between the horizontal direction and the vertical direction, when viewed from the top side, the horizontal length LH of the interface may be shorter than the vertical length LV of the interface. Since the inclination angle of the interface 30b of the liquid lens 28 at the second individual electrode L2 and the fourth individual electrode L4 is smaller than the inclination angle of the interface 30b of the liquid lens 28 at the first individual electrode L1 and the third individual electrode L3 when the voltage applied to the second individual electrode L2 and the fourth individual electrode L4 is lower than the voltage applied to the first individual electrode L1 and the third individual electrode L3, the vertical length LV is longer than the horizontal length LH when considered in three dimensions, although they seem to be the same in a plan view. In this case, the capacitance values of the interface 30b measured using the four different individual electrodes L1, L2, L3 and L4 may be different. Meanwhile, since the interface 30b is symmetrically changed in shape, the capacitance values of the interface 30b measured using the four different individual electrodes L1, L2, L3 and L4 may be symmetrical. In this case, the capacitance values from L1 and L3 may be the same, and the capacitance values from L2 and L4 may be the same.

In addition, referring to (c), in the case in which the voltage applied to the first individual electrode L1 and the third individual electrode L3 of the liquid lens 28 is different from the voltage applied to the second individual electrode L2 and the fourth individual electrode L4, when viewed from the top side, the vertical length LV of the interface may be shorter than the horizontal length LH of the interface. In the same manner as the case in (b), the capacitance values of the interface 30c measured using the four different individual electrodes L1, L2, L3 and L4 may be different. Meanwhile, since the interface 30c is symmetrically changed in shape, the capacitance values of the interface 30c measured using the four different individual electrodes L1, L2, L3 and L4 may be symmetrical. In this case, the capacitance values from L1 and L3 may be the same, and the capacitance values from L2 and L4 may be the same.

In addition, the capacitance values measured in the interfaces 30a, 30b and 30c illustrated in (a), (b) and (c) may be different, and through the difference in capacitance, movement of the interfaces 30a, 30b and 30c depending on the voltage applied to the first individual electrode L1 to the fourth individual electrode L4 may be more directly and accurately measured.

Meanwhile, although the above-described example describes the structure in which the liquid lens 28 includes four individual electrodes, when the liquid lens 28 includes a greater number of individual electrodes such as eight, twelve, or sixteen individual electrodes and further includes feedback electrodes corresponding thereto, the movement of the liquid lens 28 may be more precisely controlled, and the corresponding movement may be measured more accurately.

FIG. 19 illustrates an electrode structure of the liquid lens. Specifically, (a) illustrates the arrangement of the electrodes on opposite sides (upper portion and lower portion) of the liquid lens 28 (refer to FIG. 7), and (b) illustrates a method of measuring the capacitance between the electrodes disposed at opposite sides of the liquid lens.

First, referring to (a), four individual electrodes L1, L2, L3 and L4 for supplying a voltage are provided around the cavity on one side of the liquid lens. In addition, one or more feedback electrode F1a, F2a, F3a and F4a are provided between the four individual electrodes L1, L2, L3 and L4 on one side of the liquid lens. In some embodiments, the liquid lens may include only one feedback electrode F1. In addition, the number of individual electrodes may differ from the number of feedback electrodes. However, the feedback electrodes need to be disposed respectively at four corners so as to have the same angular distance therebetween or to be symmetrical with respect to the cavity, in order to further facilitate measurement of the movement and shape of the interface 30.

Similar to those on one side of the liquid lens, one or more feedback electrodes F1b, F2b, F3b and F4b may also be provided on the other side of the liquid lens on which the common electrode C0 is disposed. The feedback electrodes F1b, F2b, F3b and F4b provided on the other side of the liquid lens may be disposed so as to correspond to the feedback electrodes F1a, F2a, F3a and F4a provided on the one side of the liquid lens. In addition, the number of feedback electrodes F1b, F2b, F3b and F4b provided on the other side of the liquid lens may be the same as the number of feedback electrodes F1a, F2a, F3a and F4a provided on the one side of the liquid lens.

In addition, referring to (b), a method of measuring the capacitance corresponding to the interface 30 of the liquid lens will be described by way of example. As shown in (a), the feedback electrodes F1a, F2a, F3a, F4a, Fib, F2b, F3b and F4b may be disposed on opposite sides of the liquid lens to enable the measurement of capacitance in a desired direction. For example, the capacitance between two feedback electrodes F1a and f1b, which are disposed at corresponding positions on opposite sides of the liquid lens, may be measured. In addition, the capacitance between two feedback electrodes F1a and F2a, which are disposed on one side of the liquid lens, may be measured. In addition, the capacitance between two feedback electrodes Fib and F3b, which are disposed on the other side of the liquid lens, may be measured. This measurement of capacitance may be selectively performed by disposing a switching element between the feedback circuit 70 and the liquid lens 28. The measurement of capacitance in various directions and ways assists in more accurately understanding the characteristics of the interface in the liquid lens (e.g. variation in the position, movement, or shape of the interface depending on the driving voltage that is supplied). This may also assist in lens calibration, which is required to understand the characteristics of the liquid lens and to correct and more accurately control distortion of the liquid lens.

While the liquid lens mounted in a camera device or an optical device is driven, the feedback circuit 70 may measure capacitance, which varies depending on the position, movement, or shape of the interface 30. Once the position, movement, or shape of the interface 30 has been recognized via the capacitance, the result may be transferred to the voltage control circuit 40 to enable adjustment of the driving voltage when distortion has occurred.

FIG. 20 illustrates an example of the capacitance measurement circuit. The capacitance measurement circuit illustrated in FIG. 20 is proposed by way of example, and may include various components in some embodiments.

As shown, when a feedback voltage $V_F$ transferred from the feedback voltage control circuit 52 is applied to one Fla of the feedback electrodes disposed on the liquid lens, the capacitance measurement circuit 54 connected to another feedback electrode Fib may measure the capacitance between the two feedback electrodes F1a and Fib, thereby enabling the recognition of the state of the interface 30.

When the feedback voltage $V_F$ is applied and a first switch SW1 in the feedback voltage control circuit 52 is connected, the magnitude of charge Q in the interface 30 may be equal to a value obtained by multiplying variation in feedback voltage $\Delta V_F$ by the capacitance C of the interface 30. When the first switch SW1 is connected, the charge Q may move to a measuring capacitor Cap-m.

Thereafter, when a ground voltage is applied instead of the feedback voltage $V_F$, the first switch SW1 is turned off, and a second switch SW2 is turned on, the charge, which has moved to the measuring capacitor Cap-m, may move to an on-chip capacitor Cap-on. At this time, the magnitude Q of charge moving to the on-chip capacitor Cap-on may be equal to a value obtained by multiplying variation in feedback voltage $\Delta V_F$ by the capacitance of the on-chip capacitor Cap-on.

By adjusting the ratio of the number of couplings by the capacitance C of the interface 30 to the number of couplings by the on-chip capacitor Cap-on so that the total magnitude of charge accumulated in the measuring capacitor Cap-m becomes zero, the ratio of the two capacitances is calculated from the adjusted ratio. Since the capacitance of the on-chip capacitor Cap-on is a known value, the capacitance C of the interface 30 may be measured.

The configuration of the capacitance measurement circuit 54 described above may be changed in some embodiments, and an operation and a control method depending on the configuration may be changed. Here, the capacitance measurement circuit 54 may be designed so as to measure variation in capacitance within a range from a few pF to 200 pF.

FIG. 21 illustrates the connection unit of the liquid lens.

As shown, the connection unit, which connects the liquid lens and the driving circuit (e.g. the control circuit), may include a first connection unit 141, which supplies a voltage to the respective individual electrodes L1, L2, L3 and L4 using a flexible printed circuit board (FPCB), and a second connection unit 144, which supplies a common voltage C0 using a flexible printed circuit board (FPCB). In addition, the first connection unit 141 and the second connection unit 144 may further include terminals, which connect the feedback voltage control circuit 52 and the capacitance measurement circuit 54 (refer to FIG. 20) to the feedback electrodes F1a, F2a, F3a, F4a, Fib, F2b, F3b and F4b for measuring the capacitance of the interface 30 (refer to FIG. 20). The feedback voltage control circuit 52 serves to supply a feedback voltage $V_F$, and the capacitance measurement circuit 54 (refer to FIG. 20) serves to measure the capacitance of the interface 30.

The first connection unit 141 may be electrically connected to four individual electrodes L1, L2, L3 and L4 and feedback electrodes F1a, F2a, F3a and F4a. The first connection unit 141 may be connected to four feedback electrodes. Meanwhile, the second connection unit 144 serves to apply a common voltage (e.g. a ground voltage, 0V, common DC, or common AC), and may be electrically connected to feedback electrodes Fib, F2b, F3b and F4b. The second connection unit 144 may be connected to four feedback electrodes. The second connection unit 144 may have a structure corresponding to that of the first connection unit 141. The terminals, which are disposed on the first connection unit 141 and the second connection unit 144 and are connected to the electrodes, may be located at the same angular distance therebetween with respect to the cavity in the liquid lens.

In some embodiments, the liquid lens may include four or eight individual electrodes, or a greater number of individual electrodes than eight electrodes. However, the number of individual electrodes may be a multiple of 4. In addition, the number of feedback electrodes disposed on the liquid lens may be the same as or different from the number of individual electrodes included in the liquid lens.

Meanwhile, although the connection units 141 and 144 are illustrated in FIG. 21 as being open on one side thereof, in some embodiments, the connection units may be configured to surround the four sides of the liquid lens without an open area.

The capacitance of the liquid lens, which is calculated or measured by the capacitance measurement circuit, may be transferred to the voltage control circuit. The voltage control circuit, which receives the capacitance of the liquid lens, may recognize the shape or state of the interface in the liquid lens based on the capacitance. When the shape or state of the interface in the liquid lens differs from a target shape or state, the voltage control circuit may adjust the driving voltage.

FIG. 22 illustrates variation in the liquid lens depending on variation in temperature. Specifically, FIG. 22(a) illustrates a liquid lens 140B in which the focal length at room temperature is adjusted to infinity, and FIG. 22(b) illustrates a liquid lens 140C in which the focal length at a high temperature is adjusted to infinity.

In general, when a camera module including a liquid lens 140B or 140C performs auto-focusing (AF), the focal length is set to infinity in order to adjust the focal length, and then the focal length is gradually reduced so as to find the optimal focal length.

Two liquids LQ1 and LQ2, which have different properties, are provided in the cavity CA defined by the first plate 145, the second plate 147 and the third plate 146. A liquid expands with an increase in temperature (e.g. thermal expansion).

The two liquids LQ1 and LQ2 charged in the cavity CA may include an electrolytic (or conductive) liquid LQ1 and a non-electrolytic (or non-conductive) liquid LQ2. The degree of thermal expansion of a liquid may be larger than that of a solid. As the temperature of a material increases, the movement of molecules becomes more active, and the distance between the molecules increases, which may result in an increase in the volume of the material. In particular, since molecules of a liquid move more freely than molecules of a solid, a liquid may thermally expand more than a solid for the same variation in temperature. A representative example of an electrolytic (conductive) liquid used in a liquid lens is water ($H_2O$). In the case of water, the volume thereof increases when temperature rises within the range of 4° C. or higher, but the volume thereof decreases when temperature rises within the range below 4° C. The coefficient of thermal expansion of water is known to be about 1.8 (unit: $10^{-5}/°$ C.).

Referring to FIGS. 22(a) and (b), it can be seen that the volume S2 of the non-conductive liquid lens LQ2 at a high temperature is greater than the volume S1 thereof at room temperature. At a high temperature, the third plate 146 may swell due to expansion of the conductive liquid LQ1 and the non-conductive liquid LQ2.

Referring to FIG. 22(a), if there is no variation in the volume of the two liquids LQ1 and LQ2 charged in the cavity CA at room temperature, light incident through the first plate 145 may be refracted by the interface BO formed between the two liquids LQ1 and LQ2 in the cavity CA, and may pass through the third plate 146. In some embodiments, the path of light may be opposite that in the illustration. The curvature of the interface BO may be controlled by applying electrical energy to the liquid lens.

Referring to FIG. 22(b), due to variation in the volume of the two liquids LQ1 and LQ2 charged in the cavity CA at a high temperature, there may occur a phenomenon in which the first plate 145 or the third plate 146 swells. For example, due to variation in the volume of the two liquids LQ1 and LQ2 charged in the cavity CA at a high temperature, there may occur a phenomenon in which the third plate 146 swells. That is, the third plate 146 may bend in response to an increase in the volume of the two liquids depending on variation in temperature. For example, the degree to which the third plate 146 swells may vary depending on the temperature or the characteristics of the third plate 146.

When the third plate 146 swells to a certain extent, the light incident through the first plate 145 may be further refracted due to the curvature formed in the third plate 146 as well as the curvature of the interface BO, which is controlled using electrical energy. In this case, the curvature that is formed in the third plate 146 may not be considered when the lens 28 is designed.

The electrical characteristics of the lens 28 may be understood as those of a capacitor, as described with reference to FIG. 7(b). Meanwhile, referring to FIGS. 22(a) and (b), when the temperature rises, the non-conductive liquid LQ2 in the liquid lens 140B or 140C expands, which consequently changes the areas of regions on both sides of the insulation layer 148 in which electric charges are accumulated. In the capacitor, when the areas of the two electrodes disposed on respective sides of the insulation layer 148 change, the capacitance changes (area and capacitance have a directly proportional relationship therebetween).

As described with reference to FIG. 9, when voltages $V_{L1}$, $V_{L2}$, $V_{L3}$, $V_{L1}$ and $V_{C0}$ are applied to the second electrode E2 and the first electrodes E1 of the lens 28, capacitance may be generated between the second electrode E2 and the first electrodes E1. In addition, when voltages $V_{L1}$, $V_{L2}$, $V_{L3}$, $V_{L4}$ and $V_{C0}$ are applied to the second electrode E2 and the first electrodes E1, the interface BO moves, as described with reference to FIG. 5. However, due to the problem in which unintended variation in the movement of the interface BO is caused by temperature, if voltages $V_{L1}$, $V_{L2}$, $V_{L3}$, $V_{L4}$ and $V_{C0}$ are applied to the second electrode E2 and the first electrodes E1 considering variation in the refractive index of the liquid lens 140B or 140C attributable to temperature, it may be difficult to accurately control the refractive index of the lens 28.

Based on the above-described phenomena and characteristics, if the capacitance of the liquid lens 140B or 140C is measured, it is possible not only to calculate variation in the temperature in the lens 28, but also to more precisely control the movement of the interface BO in the liquid lens 140B or 140C in response to variation in temperature.

FIG. 23 illustrates a camera module 300 capable of responding to variation in temperature. For example, the camera module 300 may be mounted in a portable device, and may be interlocked with an application processor 400 included in the portable device.

As shown, the camera module 300 may include a liquid lens 28 and a control circuit 310. Here, the liquid lens 28 may be included in the lens assembly illustrated in FIG. 3, and the optical characteristics thereof may change in response to a temperature change, like the liquid lens 140B or 140C illustrated in FIG. 22. The camera module 300 may further include a plurality of lenses in addition to the lens 28, which is controlled using electrical energy.

A control circuit 310 capable of applying voltages $V_{L1}$, $V_{L2}$, $V_{L3}$, $V_{L4}$ and $V_{C0}$ to induce movement of the interface 30 in the lens 28 and measuring the capacitance of the lens 28 is included in the camera module 300. The control circuit 310 may include a driving driver 340, which applies voltages $V_{L1}$, $V_{L2}$, $V_{L3}$, $V_{L4}$ and $V_{C0}$ to the lens 28, a capacitance measurement circuit 350, which measures the capacitance of the lens 28 or measures variation in capacitance, a first switch SW10, which controls the electrical connection between the lens 28 and the capacitance measurement circuit 350, an operation state storage unit 360, which stores variation in capacitance attributable to the internal temperature of the lens 28, and a control unit 320, which controls the operation of the driving driver 340 and the capacitance measurement circuit 350 and reads a value stored in the operation state storage unit 360 or writes the recognized value.

In some embodiments, the control circuit 310 may be implemented as a circuit board on which at least one semiconductor chip is mounted. In addition, the control unit 320 may include a field programmable gate array (FPGA), which includes a semiconductor device in which programmable logic elements and programmable internal lines are included, or at least one processor, and the operation state storage unit 360 may include at least one memory.

In some embodiments, the operation state storage unit 360 may store the electrical characteristics of the lens 28 (e.g. capacitance), which varies depending on variation in the internal temperature of the lens 28. In addition, in some embodiments, the operation state storage unit 360 may store information about relationship between the electrical characteristics of the lens 28 and other environmental factors that may influence the operation of the lens 28, in addition to temperature.

The control circuit 310 may not only measure the capacitance of the lens 28 and use the same to determine voltages $V_{L1}$, $V_{L2}$, $V_{L3}$, $V_{L4}$ and $V_{C0}$ to be supplied to the lens 28, but may also estimate, calculate, or determine the temperature of the lens 28 based on the measured capacitance. To this end, the camera module 300 may perform a separate capacitance measurement operation before performing an auto-focusing (AF) operation or a hand-tremor compensation or optical image stabilizer (OIS) operation. Alternatively, in some embodiments, the camera module 300 may perform a capacitance measurement operation at an initial stage of performing auto-focusing (AF). Here, the capacitance measurement operation performed by the camera module 300 may be executed for a time period corresponding to a frame rate.

In addition, the control unit 320 may control a temperature controller 370 based on the calculated or determined temperature, and may transmit information on the calculated or determined temperature to the application processor 400, which is interlocked with the camera module 300.

In addition, the camera module 300 may further include a temperature controller 370 for lowering or raising the ambient temperature and a correction value storage unit 380 for correcting the optical characteristics of the lens assembly of the camera module 300. For example, the correction value storage unit 380 may be implemented as a memory device capable of storing data even when power is not supplied to the camera module 300, and may include data used to correct the distortion of an image obtained through the image sensor, which is caused by mechanical factors that affect the optical characteristics of the camera module 300, such as, for example, the plurality of lenses included in the lens assembly of the camera module 300, the distance between the lens assembly and the image sensor, and the angle formed by the lens assembly and the image sensor.

In addition, the correction value storage unit 380 may store information related to the temperature and capacitance of the lens 28. For example, the capacitance of the lens 28 obtained when a preset voltage is applied to the lens 28 and variation in the capacitance of the lens 28 obtained when a preset voltage is applied thereto at each variation in the temperature in the lens 28 may be stored. In some embodiments, it is possible to more precisely control the movement of the interface 30 in the lens 28 when the correction value storage unit 380 stores a large variety of concrete pieces of information on the dependence of the electrical characteristics of the lens 28 on the operational environment (temperature, etc.) of the lens 28.

The control unit 320 may control the driving driver 340 in order to measure the capacitance of the lens 28. In some embodiments, the magnitude of the voltages $V_{L1}$, $V_{L2}$, $V_{L3}$, $V_{L4}$ and $V_{C0}$ applied to measure the capacitance of the lens 28 may be substantially the same as or different from the magnitude of the voltage for inducing movement of the interface 30. However, the magnitude of the voltages $V_{L1}$, $V_{L2}$, $V_{L3}$, $V_{L4}$ and $V_{C0}$ applied to measure capacitance of the lens 28 may be substantially the same as the magnitude of the voltage used to generate information on capacitance stored in the correction value storage unit 380.

FIG. 24 illustrates a first method of determining the temperature by measuring the capacitance of the lens. For example, the first method illustrated in (a) and (b) is a method of measuring the capacitance of the lens at the beginning of a process in which auto-focusing (AF) is performed, when the camera module 300 illustrated in FIG. 23 operates.

Referring to FIG. 24(a), when the camera module is turned on or when a user changes the area to be photographed by a camera, an auto-focusing (AF) operation may be performed in order to adjust the focus, and thereafter a photographing mode (a state in which a user is able to press a photographing button) may be activated. As methods of performing auto-focusing (AF) in a camera, there are a phase difference detection method (phase-difference AF) and a contrast detection method (contrast AF).

For example, in phase-difference AF, when light (image) reflected from an object enters the lens assembly, the light (image) is divided in the rear side of the lens assembly so as to be transmitted to two or more AF sensors, which are provided in the camera. The AF sensors calculate the distance by which the two light beams are spaced apart from each other on the respective sensors and adjust the focus by moving the lenses such that the distance between the two light beams is optimized. This method may also be called 'through-the-lens (TTL) phase-difference AF', with the meaning that light has passed through the lens assembly.

In addition, contrast AF is a method of adjusting the focus by recognizing the contrast of an object, i.e. distinguishing the difference between a bright area and a dark area. If the focus is correctly adjusted, the contour of the image is clear, and thus the contrast increases. If the focus is not correctly adjusted, the contour of the image is blurred, and thus the contrast decreases. During usage of a compact camera, when a shutter key is half pressed, the focus may be adjusted after an image displayed on an LCD screen repeatedly appears blurred and clear. This is a process in which the camera finds the area having the highest contrast by moving the lenses.

Referring to FIG. 24(a), when the phase-difference AF or contrast AF method is performed, at the time of commencement of auto-focusing, after the focal length is set to infinity, a first voltage 302 may be applied, and subsequently a second voltage 304 may be applied to reduce the focal length. The voltage 302 is applied to the lens 28 at the time of commencement of auto-focusing in order to set an infinite focal length. Through this process, the capacitance of the lens 28 may be measured. The period during which the capacitance is measured may be equal to or shorter than the time taken for the camera module to obtain one image frame.

Since the voltage 302 for setting the infinite focal length has a preset value, the correction value storage unit 380 may store a capacitance corresponding to the corresponding voltage 302 in order to correct the lens 28. In some embodiments, the voltage 302 may be simultaneously applied to the first electrodes E1 corresponding to the plurality of segments, which correspond to four divided individual electrodes L1 to L4 included in the lens 28. Alternatively, in some embodiments, the voltage 302 may be sequentially applied to the plurality of segments, which correspond to four divided individual electrodes L1 to L4 included in the lens 28.

Referring to FIG. 24(b), the correction value storage unit 380 may store a capacitance value corresponding to the temperature of the lens 28. For example, the lens 28 may have a first capacitance C1 at a first temperature T1, and may have a second capacitance C2 at a second temperature T2. In some embodiments, the first capacitance C1 and the second capacitance C2 of the lens 28 may be the total capacitance of the lens 28, or may be the capacitance formed between one of the first electrodes E1 and the second electrode E2 included in the lens 28. For example, in the case in which the first electrodes E1 include a plurality of segments, which correspond to four divided individual electrodes L1 to L4, the information stored in the correction value storage unit 380 may be the total capacitance of the four unit capacitors corresponding to the respective segments, as described with reference to FIG. 7(b). In some embodiments, the information may be the capacitance of each of the unit capacitors corresponding to a respective one of the segments.

The capacitance of the lens 28 may be measured using the capacitance measurement circuit 350, and may be compared with the capacitance of the lens 28 at a preset temperature using the correction value storage unit 380. The control unit 320 may compare the information stored in the correction value storage unit 380 with the measured capacitance to calculate the temperature of the lens 28 corresponding to the measured capacitance. Alternatively, in some embodiments, the control unit 320 may calculate the temperature using a relational formula (T=f(ΔCap.)) between variation in capacitance (ΔCap.) and temperature (T), which is determined based on the electrical characteristics of the lens 28. Alternatively, the control unit 320 may determine the temperature of the lens 28 by referring to a look-up table that is stored in the operation state storage unit 360 and stores information on the relationship between variation in capacitance (ΔCap.) and temperature (T).

According to the first method described with reference to FIG. 24, it may be difficult to measure the temperature of the lens 28 while the photographing mode is maintained in the state in which there is no variation in the focal length after completion of the auto-focusing operation by the camera module. For example, even when the camera module takes a video for a long time and thus the temperature of the lens 28 increases, so long as there is no variation in the focal length, it is not necessary to perform an auto-focusing operation, and accordingly the capacitance may not be measured.

As a method for overcoming this problem, a sensor capable of detecting a focal length may be provided in the camera module 300. For example, in the case of directly measuring the distance between the object included in the image screen in the camera module 300 and the camera module 300 using, for example, an infrared sensor, it is possible to recognize the directly measured focal length and the magnitude of the voltage applied to the lens 28 in order to realize the corresponding focal length. In this case, if the correction value storage unit 380 includes a relational formula between variation in capacitance and variation in temperature upon application of the corresponding voltage or information corresponding thereto, the section within which the capacitance of the lens 28 can be measured during the operation of the camera module may be more freely set.

As described above with reference to FIG. 24, according to the first method of determining the temperature by measuring the capacitance of the lens, a separate section is set in order to measure capacitance, thus exhibiting an advantage in that the operation of the camera module is not interrupted. In addition, since the voltage 302 that is used in the process of performing an auto-focusing operation by the camera module is also capable of being used to measure capacitance, there is also an advantage in that it is not necessary to apply a separate voltage to the lens 28 in order to measure capacitance.

FIG. 25 illustrates a second method of determining the temperature by measuring the capacitance of the lens. For example, the second method illustrated in (a) and (b) is a method of more freely measuring the capacitance of the lens during the operation of the camera module 300 without provision of a distance sensor in the camera module 300 illustrated in FIG. 23.

Like the first method illustrated in FIG. 24, since a voltage for measuring the capacitance of the lens 28 is set in advance or the distance to an object (focal length) is capable of being separately collected, it is possible to determine the temperature of the lens 28 using only the relationship between temperature and capacitance, so long as the current voltage or a voltage used to measure capacitance is specified. However, in order to freely measure capacitance during the operation of the camera module 300 having no distance sensor, information on the relationship between variation in temperature and capacitance corresponding to the magnitude of voltage is required in order to determine the temperature of the lens 28, like the second method illustrated in FIG. 25.

Referring to FIG. 25(a), it can be seen that the control circuit 310 is capable of measuring the capacitance of the lens 28 while the camera module 300 performs a hand-tremor compensation or optical image stabilizer (OIS) function. Here, although the hand-tremor compensation or optical image stabilizer (OIS) function is given by way of example, it is also possible to measure the capacitance of the lens 28 while the camera module 300 performs an auto-focusing (AF) function or performs other operations.

For example, in order for the camera module 300 to perform a hand-tremor compensation or optical image stabilizer (OIS) function, a voltage 404 may be applied to the lens 28. However, if the capacitance of the lens 28 is measured when the voltage 404 is applied for the hand-tremor compensation or optical image stabilizer (OIS) function, it may affect the movement of the interface 30, thus disturbing the hand-tremor compensation or optical image stabilizer (OIS) function. Therefore, in the section in which the capacitance of the lens 28 is measured, the hand-tremor compensation or optical image stabilizer (OIS) operation may be temporarily stopped, and a separate voltage 402 may be applied to the lens 28 in order to measure capacitance. Here, since the time taken to measure capacitance may be equal to or shorter than the time taken for the camera module to obtain one image frame, the hand-tremor compensation or optical image stabilizer (OIS) operation may be resumed after the capacitance measurement section is finished. When the capacitance is completely measured, a voltage 406 may be applied to the lens 28 in order to perform the hand-tremor compensation or optical image stabilizer (OIS) operation.

Since the time taken to measure capacitance is very short, users of the camera module may not be aware of the capacitance measurement. In addition, since a separate voltage is applied in order to measure capacitance, it is possible to prevent the operation of the camera module from being disturbed due to measurement of the capacitance of the lens 28.

In addition, in some embodiments, a voltage 402 may be simultaneously applied to the first electrodes E1 corresponding to a plurality of segments, which correspond to four divided individual electrodes L1 to L4 included in the lens 28. In addition, since voltages 404 and 406 may be applied differently to a plurality of segments, which correspond to four divided individual electrodes L1 to L4, in order to perform the hand-tremor compensation or optical image stabilizer (OIS) operation, the voltage 402, which is applied to the lens 28 in order to measure capacitance, may also be applied differently to the segments. Meanwhile, in some embodiments, the voltage 402 may be sequentially applied to a plurality of segments, which correspond to four divided individual electrodes L1 to L4 included in the lens 28, or may be applied to only one segment in order to measure the capacitance of the lens 28.

Referring to FIG. 25(b), the correction value storage unit 380 may store a capacitance value corresponding to variation in the temperature the lens 28 and to the magnitude of voltage. For example, when a first voltage V1 is applied thereto at a first temperature T1, the lens 28 may have a first capacitance C11, and when the first voltage V1 is applied thereto at a second temperature T2, the lens 28 may have a second capacitance C12. In some embodiments, the first capacitance C1 and the second capacitance C2 of the lens 28 may be the total capacitance of the lens 28, or may be the capacitance formed between one of the first electrodes E1 and the second electrode E2 included in the lens 28. For example, in the case in which the first electrodes E1 include a plurality of segments, which correspond to four divided individual electrodes L1 to L4, the information stored in the correction value storage unit 380 may be the total capacitance of the four unit capacitors corresponding to the respective segments, as described with reference to FIG. 7(b). In some embodiments, the information may be the capacitance of each of the unit capacitors corresponding to a respective one of the segments.

The capacitance of the lens 28 may be measured using the capacitance measurement circuit 350, and may be compared with the capacitance of the lens 28 at a preset temperature and the magnitude of the voltage applied to the lens 28 using the correction value storage unit 380. The control unit 320 may compare the information stored in the correction value storage unit 380 and the magnitude of the voltage applied for measurement of capacitance with the measured capacitance to calculate the temperature of the lens 28 corresponding to the measured capacitance. Alternatively, in some embodiments, the control unit 320 may calculate the temperature using a relational formula (T=f(V,ΔCap.)) related to temperature (T) that varies depending on the applied voltage and variation in capacitance (ΔCap.), which is determined based on the electrical characteristics of the lens 28. Alternatively, the control unit 320 may determine the temperature of the lens 28 by referring to a look-up table that is stored in the operation state storage unit 360 and stores information on the relationship between temperature (T) and each of the voltage (V) and variation in capacitance (ΔCap.).

Meanwhile, in some embodiments, the liquid lens included in the camera module may include four or eight individual electrodes, or a greater number of individual electrodes than eight electrodes. However, the number of individual electrodes may be a multiple of 4. In addition, the number of feedback electrodes disposed on the liquid lens may be the same as or different from the number of individual electrodes included in the liquid lens.

The capacitance of the liquid lens, which is calculated or measured by the capacitance measurement circuit, may be transferred to the voltage control circuit. The voltage control circuit, which receives the capacitance of the liquid lens, may recognize the shape or state of the interface in the liquid lens based on the capacitance. When the shape or state of the interface in the liquid lens differs from a target shape or state, the voltage control circuit may adjust the driving voltage.

The above-described liquid lens may be included in the camera module. The camera module may include a lens assembly, which includes a liquid lens mounted in a housing and at least one solid lens that may be disposed on the front surface or the rear surface of the liquid lens, an image sensor for converting an optical signal transmitted through the lens assembly into an electrical signal, and a control circuit for supplying a driving voltage to the liquid lens.

Although only a limited number of embodiments have been described above, various other embodiments are possible. The technical contents of the above-described embodiments may be combined into various forms as long as they are not incompatible with one another, and thus may be implemented in new embodiments.

An optical device (or an optical instrument) including the above-described camera module may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include a liquid lens. In addition, the optical device may be implemented in a portable device such as, for example, a smartphone, a laptop computer, or a tablet computer. Such an optical device may include a camera module, a display unit configured to output an image, and a body housing in which the camera module and the display unit are mounted. A communication module capable of communicating with other devices may be mounted in the body housing of the optical device, and the optical device may further include a memory unit capable of storing data.

The method according to the embodiment described above may be programmed to be executed in a computer and may be stored on a computer-readable recording medium, and examples of the computer-readable recording medium may include ROM, RAM, a CD-ROM, a magnetic tape, a floppy disk, and an optical data storage device.

The computer-readable recording medium may also be distributed over network-coupled computer systems so that the computer-readable code is stored and executed in a distributed fashion. Also, functional programs, code, and code segments for accomplishing the above-described method may be easily construed by programmers skilled in the art to which the embodiment pertains.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

MODE FOR INVENTION

Various embodiments have been described in the best mode for carrying out the disclosure.

INDUSTRIAL APPLICABILITY

A camera module according to embodiments may be used in camera/video devices, telescopic devices, microscopic

The invention claimed is:

1. A camera module, comprising:
a lens assembly comprising a liquid lens and at least one solid lens disposed above or below the liquid lens, the liquid lens comprising a plurality of individual electrodes and a common electrode;
a driving driver configured to supply a voltage through the common electrode and at least one of the plurality of individual electrodes in the liquid lens in order to control an interface of the liquid lens;
a capacitance measurement circuit configured to measure capacitance between the common electrode and at least one of the plurality of individual electrodes in the liquid lens;
an operation state storage unit configured to store information on capacitance that varies depending on variation in temperature in the liquid lens;
a control unit configured to determine a temperature in the liquid lens based on the capacitance measured by the capacitance measurement circuit and the information; and
a temperature controller for lowering or raising an ambient temperature of the camera module,
wherein the liquid lens further comprises:
a first plate comprising a cavity in which a conductive liquid and a non-conductive liquid are disposed;
a second plate disposed on the first plate; and
a third plate disposed under the first plate,
wherein the common electrode is disposed on the first plate,
wherein the plurality of individual electrodes is disposed under the first plate,
wherein the control unit is further configured to:
control the temperature controller based on the determined temperature, and
transmit information on the determined temperature to an application processor interlocked with the camera module, and
wherein, at commencement of an auto-focusing operation, the control unit applies a voltage, which has a predetermined fixed level, to set an infinite focal length to measure a capacitance of the liquid lens through the capacitance measurement circuit.

2. The camera module according to claim 1, further comprising:
a first switch disposed between the liquid lens and the capacitance measurement circuit,
wherein the first switch is turned on for a time period equal to a time taken to obtain one image frame through an image sensor.

3. The camera module according to claim 1, wherein the control unit stops the auto-focusing operation or an optical image stabilizer operation to measure the capacitance of the liquid lens through the capacitance measurement circuit, and resumes the auto-focusing or the optical image stabilizer operation after measurement of the capacitance.

4. The camera module according to claim 1, wherein the voltage applied to measure the capacitance of the liquid lens through the capacitance measurement circuit has a level different from a level of the voltage applied to control the interface.

5. The camera module according to claim 1, further comprising:
a distance sensor configured to measure a focal length to an object,
wherein the control unit transfers a voltage corresponding to the focal length to the liquid lens via the driving driver, and
wherein the capacitance measurement circuit measures the capacitance of the liquid lens.

6. The camera module according to claim 1, wherein the operation state storage unit stores information on capacitance that varies depending on variation in the temperature in the liquid lens and the voltage supplied from the driving driver.

7. The camera module according to claim 1, further comprising:
a correction value storage unit configured to store electrical characteristics or optical characteristics of the liquid lens and the at least one solid lens in the lens assembly.

8. The camera module according to claim 7, wherein the correction value storage unit stores variation in the capacitance of the liquid lens obtained when a preset voltage is applied thereto at each variation in the temperature in the liquid lens.

9. The camera module according to claim 7, wherein a magnitude of voltage applied to measure the capacitance of the liquid lens is the same as a magnitude of voltage used to generate information on capacitance stored in the correction value storage unit.

10. The camera module according to claim 7, wherein the control unit compares information stored in the correction value storage unit with the capacitance measured by the capacitance measurement circuit, to calculate the temperature of the liquid lens corresponding to the measured capacitance.

11. The camera module according to claim 7, wherein the correction value storage unit stores the capacitance of the liquid lens when a preset voltage is applied to the liquid lens.

12. The camera module according to claim 1, wherein the control unit calculates the temperature of the liquid lens using a relational formula related to temperature that varies depending on an applied voltage and variation in capacitance, which is determined based on an electrical characteristics of the liquid lens.

13. The camera module according to claim 1, wherein the control unit determines the temperature of the liquid lens by referring to a look-up table that is stored in the operation state storage unit and stores information on a relationship between variation in capacitance and temperature.

14. The camera module according to claim 1, wherein a voltage that is used in a process of performing the auto-focusing operation is capable of being used to measure the capacitance.

15. The camera module according to claim 1, comprising a first switch disposed between the liquid lens and the capacitance measurement circuit,
wherein the first switch is turned on for a time period shorter than a time taken to obtain one image frame through an image sensor.

16. The camera module according to claim 1, wherein the control unit controls the temperature controller based on the determined temperature.

* * * * *